US008961307B2

(12) United States Patent
Akifusa et al.

(10) Patent No.: US 8,961,307 B2
(45) Date of Patent: Feb. 24, 2015

(54) GAME SYSTEM, GAME PROCESSING METHOD, GAME APPARATUS, AND COMPUTER-READABLE STORAGE MEDIUM

(75) Inventors: Yusuke Akifusa, Kyoto (JP); Hideki Fujii, Kyoto (JP); Toshikazu Kiuchi, Kyoto (JP); Atsushi Yamazaki, Kyoto (JP); Yosuke Sakooka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/596,651

(22) Filed: Aug. 28, 2012

(65) Prior Publication Data

US 2013/0324238 A1  Dec. 5, 2013

(30) Foreign Application Priority Data

May 31, 2012  (JP) .................. 2012-124373

(51) Int. Cl.
*A63F 9/24* (2006.01)
*A63F 13/00* (2014.01)

(52) U.S. Cl.
USPC .............. 463/31; 463/30; 463/37; 463/42

(58) Field of Classification Search
CPC ......... A63F 13/00; A63F 13/02; A63F 13/06; A63F 2300/10; A63F 2300/1043; A63F 2300/1062; A63F 2300/20; A63F 2300/204; A63F 2300/30; A63F 2300/301; A63F 2300/305; A63F 2300/306; A63F 2300/6045; A63F 2300/65; A63F 2300/66; A63F 2300/8088
USPC .................................. 463/30–32, 36–43
See application file for complete search history.

(56) References Cited

U.S. PATENT DOCUMENTS

| 5,393,073 A * | 2/1995 | Best ........................... 463/35 |
| 6,821,204 B2 * | 11/2004 | Aonuma et al. ............. 463/32 |
| 6,921,336 B1 * | 7/2005 | Best ........................... 463/32 |
| 6,966,837 B1 * | 11/2005 | Best ........................... 463/33 |
| 7,115,031 B2 * | 10/2006 | Miyamoto et al. ........... 463/1 |
| 7,347,780 B1 * | 3/2008 | Best ........................... 463/37 |
| 7,699,704 B2 * | 4/2010 | Suzuki et al. ............... 463/30 |
| 8,246,460 B2 * | 8/2012 | Kitahara .................... 463/37 |
| 8,419,537 B2 * | 4/2013 | Miyamoto et al. .......... 463/31 |
| 8,547,401 B2 * | 10/2013 | Mallinson et al. ......... 345/633 |
| 8,647,200 B2 * | 2/2014 | Abe .......................... 463/31 |
| 8,747,222 B2 * | 6/2014 | Yamashita .................. 463/31 |
| 8,814,682 B2 * | 8/2014 | Yamashita et al. .......... 463/31 |
| 8,840,478 B2 * | 9/2014 | Nogami et al. ............. 463/42 |
| 2002/0165028 A1 * | 11/2002 | Miyamoto et al. .......... 463/46 |
| 2003/0216177 A1 * | 11/2003 | Aonuma et al. ............. 463/32 |
| 2004/0023719 A1 * | 2/2004 | Hussaini et al. ............ 463/37 |
| 2004/0092309 A1 * | 5/2004 | Suzuki ....................... 463/32 |
| 2004/0266529 A1 * | 12/2004 | Chatani ...................... 463/40 |
| 2005/0007384 A1 * | 1/2005 | Yamada et al. ............ 345/619 |
| 2007/0155487 A1 * | 7/2007 | Nakano et al. ............. 463/29 |

(Continued)

FOREIGN PATENT DOCUMENTS

JP  2012-061301  3/2012
WO  WO 2007128949 A1 *  11/2007

*Primary Examiner* — Milap Shah
(74) *Attorney, Agent, or Firm* — Nixon & Vanderhye, P.C.

(57) ABSTRACT

When a certain user is playing a game by operating a terminal device while viewing a terminal game image displayed on an LCD of the terminal device, another user can operate a controller while viewing a monitor game image displayed on a monitor, and can acquire, remove, move, or halt an object other than a player object by moving a cursor displayed on a monitor game image.

16 Claims, 16 Drawing Sheets

(56) References Cited

U.S. PATENT DOCUMENTS

| | | |
|---|---|---|
| 2010/0255910 A1* | 10/2010 | Miyamoto et al. ............... 463/31 |
| 2011/0190061 A1* | 8/2011 | Takeda et al. ................... 463/39 |
| 2012/0086630 A1* | 4/2012 | Zhu et al. ....................... 345/156 |
| 2012/0229512 A1* | 9/2012 | Hayashi et al. ................ 345/649 |
| 2012/0309512 A1* | 12/2012 | Abe ................................ 463/30 |
| 2012/0309513 A1* | 12/2012 | Abe ................................ 463/30 |
| 2012/0309542 A1* | 12/2012 | Nogami et al. ................. 463/42 |
| 2013/0090165 A1* | 4/2013 | Shikata et al. .................. 463/31 |

* cited by examiner

F I G. 1 4
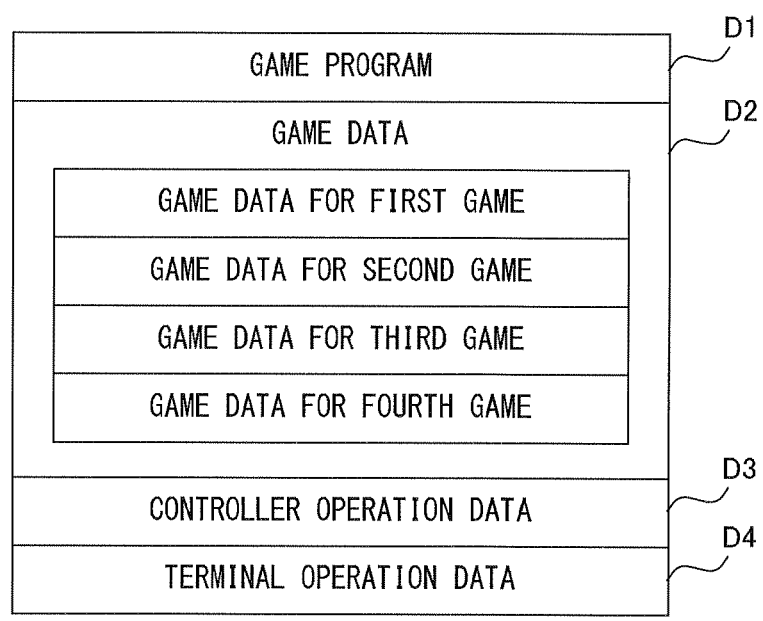

GAME SYSTEM, GAME PROCESSING METHOD, GAME APPARATUS, AND COMPUTER-READABLE STORAGE MEDIUM

CROSS REFERENCE TO RELATED APPLICATION

The disclosure of Japanese Patent Application No. 2012-124373, filed on May 31, 2012, is incorporated herein by reference.

FIELD

The technology disclosed herein relates to a game system, a game processing method, a game apparatus, and a computer-readable storage medium.

BACKGROUND AND SUMMARY

Conventionally, there are games that allow a user to operate a handheld device and shoot an object (throwing star) within a game space displayed on a display device that is separate from the handheld device.

In such conventional games, there has been a problem where although the user playing the game (i.e., the user operating the handheld device) can enjoy the game, another user cannot participate in the game and can only see a game screen displayed on the display device.

Thus, there have been demands to provide a game system, a game processing method, a game apparatus, and a computer-readable storage medium allowing another user to participate in a game that is being played by a certain user.

For example, the above described objective can be achieved by the following configurational examples.

A first configurational example is a game system including at least a game apparatus and a first operation device. The first operation device includes a first operation section and a first display section, and is configured to transmit first operation data based on an operation performed on the first operation section. The game apparatus includes: a game processor configured to control a first operation subject in a virtual space and conduct a game process, based on at least the first operation data; a first image generation section configured to generate a first game image that is to be displayed on the first display section, based on the game process; and a second image generation section configured to, based on the game process, generate a second game image that is to be displayed on a second display section that is separate from the first operation device. The game apparatus is operable to additionally acquire second operation data from a second operation device. The game processor is further configured to, during the game process and when the second operation data is acquired, control a position of a second operation subject included in the second game image based on the second operation data, and conduct a predetermined process on a predetermined object that is in the virtual space and that is different from the first operation subject, based on the position of the second operation subject.

The second image generation section may be configured to generate, as the second game image, a game image that is different from the first game image.

The first image generation section may be configured to generate, as the first game image, an image that is a view of the virtual space from a first viewpoint; and the second image generation section may be configured to generate, as the second game image, an image that is a view of the virtual space from a second viewpoint that is different from the first viewpoint.

The first image generation section may be configured to generate the first game image that includes the first operation subject.

The second operation subject may be a cursor.

The predetermined object may be an item object. The game processor may be further configured to conduct an item acquiring process of acquiring the item object corresponding to the position of the second operation subject based on the second operation data, and change a predetermined parameter regarding the first operation subject based on the acquired item object.

The game processor may be further configured to move or remove the predetermined object corresponding to the position of the second operation subject, based on the second operation data.

The predetermined object may be an obstacle object that obstructs advance of the first operation subject.

The game processor may be configured to halt the predetermined object corresponding to the position of the second operation subject, based on the second operation data.

A user operating the second operation device may be allowed to assist a game played by a user operating the first operation device, by operating the second operation device and causing the game processor to conduct the predetermined process on the predetermined object.

A user operating the second operation device may be allowed to obstruct a game played by a user operating the first operation device, by operating the second operation device and causing the game processor to conduct the predetermined process on the predetermined object.

A second configurational example is a game processing method of a game system including at least a game apparatus and a first operation device. The first operation device includes a first operation section and a first display section, and is configured to transmit first operation data based on an operation performed on the first operation section. The game processing method includes: controlling a first operation subject in a virtual space and conducting a game process, by a game processor of the game apparatus and based on at least the first operation data; generating a first game image that is to be displayed on the first display section, by a first image generation section of the game apparatus and based on the game process; and generating, by a second image generation section of the game apparatus and based on the game process, a second game image that is to be displayed on a second display section that is separate from the first operation device. The game apparatus is operable to additionally acquire second operation data from a second operation device. The game processor is further configured to, during the game process and when the second operation data is acquired, control a position of a second operation subject included in the second game image based on the second operation data, and conduct a predetermined process on a predetermined object that is in the virtual space and that is different from the first operation subject, based on the position of the second operation subject.

A third configurational example is a game apparatus used in a game system including at least the game apparatus and a first operation device. The first operation device includes a first operation section and a first display section, and is configured to transmit first operation data based on an operation performed on the first operation section. The game apparatus includes: a game processor configured to control a first operation subject in a virtual space and conduct a game process, based on at least the first operation data; a first image generation section configured to generate a first game image that is to be displayed on the first display section, based on the game process; and a second image generation section configured to, based on the game process, generate a second game image that is to be displayed on a second display section that is separate from the first operation device. The game apparatus is operable to additionally acquire second operation data from a second operation device. The game processor is further configured to, during the game process and when the second operation data is acquired, control a position of a second operation subject included in the second game image based on the second operation data, and conduct a predetermined process on a predetermined object that is in the virtual space and that is different from the first operation subject, based on the position of the second operation subject.

A fourth configurational example is a computer-readable storage medium, having stored thereon a game program executed by a computer of a game apparatus of a game system including at least the game apparatus and a first operation device. The first operation device includes a first operation section and a first display section, and is configured to transmit first operation data based on an operation performed on the first operation section. The game program causes the computer to function as: a game processor configured to control a first operation subject in a virtual space and conduct a game process, based on at least the first operation data; a first image generation section configured to generate a first game image that is to be displayed on the first display section, based on the game process; and a second image generation section configured to, based on the game process, generate a second game image that is to be displayed on a second display section that is separate from the first operation device. The game apparatus is operable to additionally acquire second operation data from a second operation device. The game processor is further configured to, during the game process and when the second operation data is acquired, control a position of a second operation subject included in the second game image based on the second operation data, and conduct a predetermined process on a predetermined object that is in the virtual space and that is different from the first operation subject, based on the position of the second operation subject.

It should be noted that, the above described game program may be stored on any computer-readable storage medium (e.g., flexible disks, hard disks, optical discs, magneto-optical discs, CD-ROMs, CD-Rs, magnetic tapes, semiconductor memory cards, ROMs, RAMs, etc.).

The present technology allows another user to participate in a game that is being played by a certain user. In particular, it is possible to assist the progress of a game played by a player. On the other hand, it is also possible to obstruct the progress. In addition, since there would be cases where an action intended to assist a player will actually be obstructive, communication among players is stimulated, and a game that is supposed to be advanced by a single person can now be enjoyed by multiple people.

These and other objects, features, aspects and advantages of the present technology will become more apparent from the following detailed descriptions when taken in conjunction with the accompanying drawings.

BRIEF DESCRIPTION OF THE DRAWINGS

FIG. 14 shows a non-limiting example of a program and data stored in an external main memory 12;

DETAILED DESCRIPTION OF NON-LIMITING EXAMPLE EMBODIMENTS

A game system according to one embodiment of the present technology will be described with reference to FIG. 1.

Figure 1:
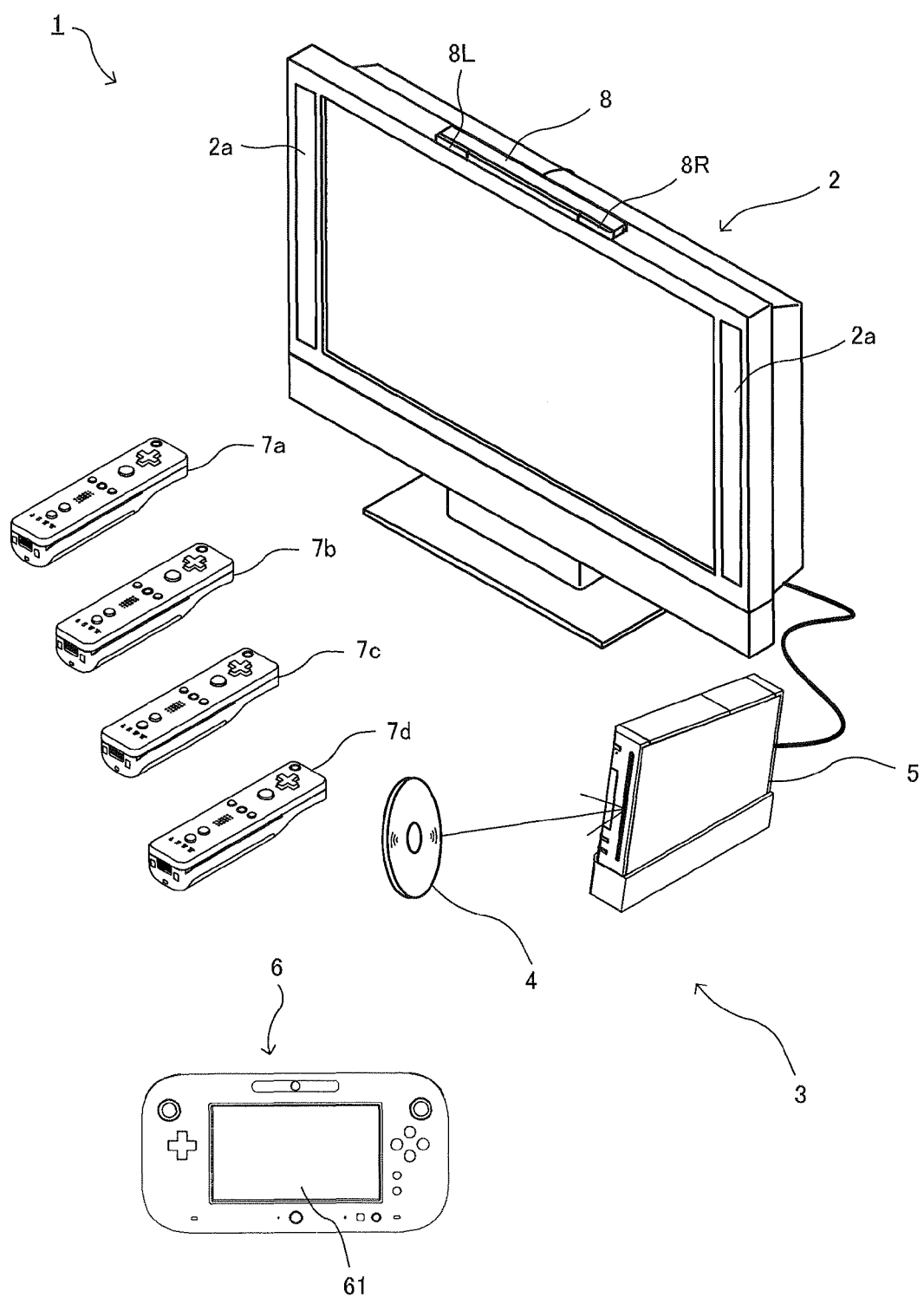
FIG. 1 is a perspective view showing a non-limiting example of a game system 1.

As shown in FIG. 1, a game system 1 includes a monitor 2 and a game apparatus 3. The monitor 2 includes loudspeakers 2a. Furthermore, the game apparatus 3 includes an optical disc 4, a game apparatus body 5, a terminal device 6, and controllers 7a, 7b, 7c, and 7d (hereinafter, described simply as a controller 7 when there is no particular need to distinguish these as the controllers 7a, 7b, 7c, and 7d).

The optical disc 4 has stored therein an information processing program (typically, a game program) to be executed by the game apparatus body 5.

The monitor 2 displays a game image outputted from the game apparatus body 5. Each of the loudspeakers 2a outputs a game sound outputted from the game apparatus body 5.

The game apparatus body 5 executes a game process or the like based on a game program etc., stored in the optical disc 4.

A plurality of operation sections (operation buttons) are provided on the controller 7. The controller 7 transmits, to the game apparatus body 5, operation button data representing input states (whether or not each of the operation buttons has been held down) of the operation sections.

Furthermore, the controller 7 includes an imaging section for taking images of a marker 8 having two LED modules (hereinafter, referred to as "markers") 8L and 8R disposed in the vicinity (in the upper side of the screen in FIG. 1) of the display screen of the monitor 2, and an imaging information calculation section for calculating positions of the markers within an image taken by the imaging section. The positions of the markers calculated by the imaging information calculation section are transmitted to the game apparatus body 5 as marker coordinate data. In the game apparatus body 5, the movement, position, attitude, or the like can be calculated by the controller 7 based on the marker coordinate data.

Furthermore, the controller 7 is provided with an acceleration sensor and a gyro sensor. Acceleration data representing acceleration detected by the acceleration sensor and angular velocity data representing angular velocity detected by the gyro sensor are transmitted to the game apparatus body 5. In the game apparatus body 5, directions or movements of the controller 7 can be calculated based on the acceleration data and/or the angular velocity data.

In the following description, the operation button data, the marker coordinate data, the acceleration data, and the angular velocity data transmitted from the controller 7 to the game apparatus body 5 are collectively referred to as controller operation data.

The terminal device 6 includes an LCD (Liquid Crystal Display) 61 as display means, and input means (a touch panel 62, a gyro sensor 604, or the like described later). The terminal device 6 and the game apparatus body 5 are communicable with each other wirelessly or via a cable. The terminal device 6 receives, from the game apparatus body 5, data of an image (e.g., a game image) generated in the game apparatus body 5, and displays the image represented by the data on the LCD 61. Instead of the LCD 61, for example, a display device utilizing EL (Electro Luminescence) may be used. Further, the terminal device 6 transmits, to the game apparatus body 5, operation data (hereinafter, referred to as terminal operation data) representing the content of an operation performed on the terminal device 6.

Figure 2:
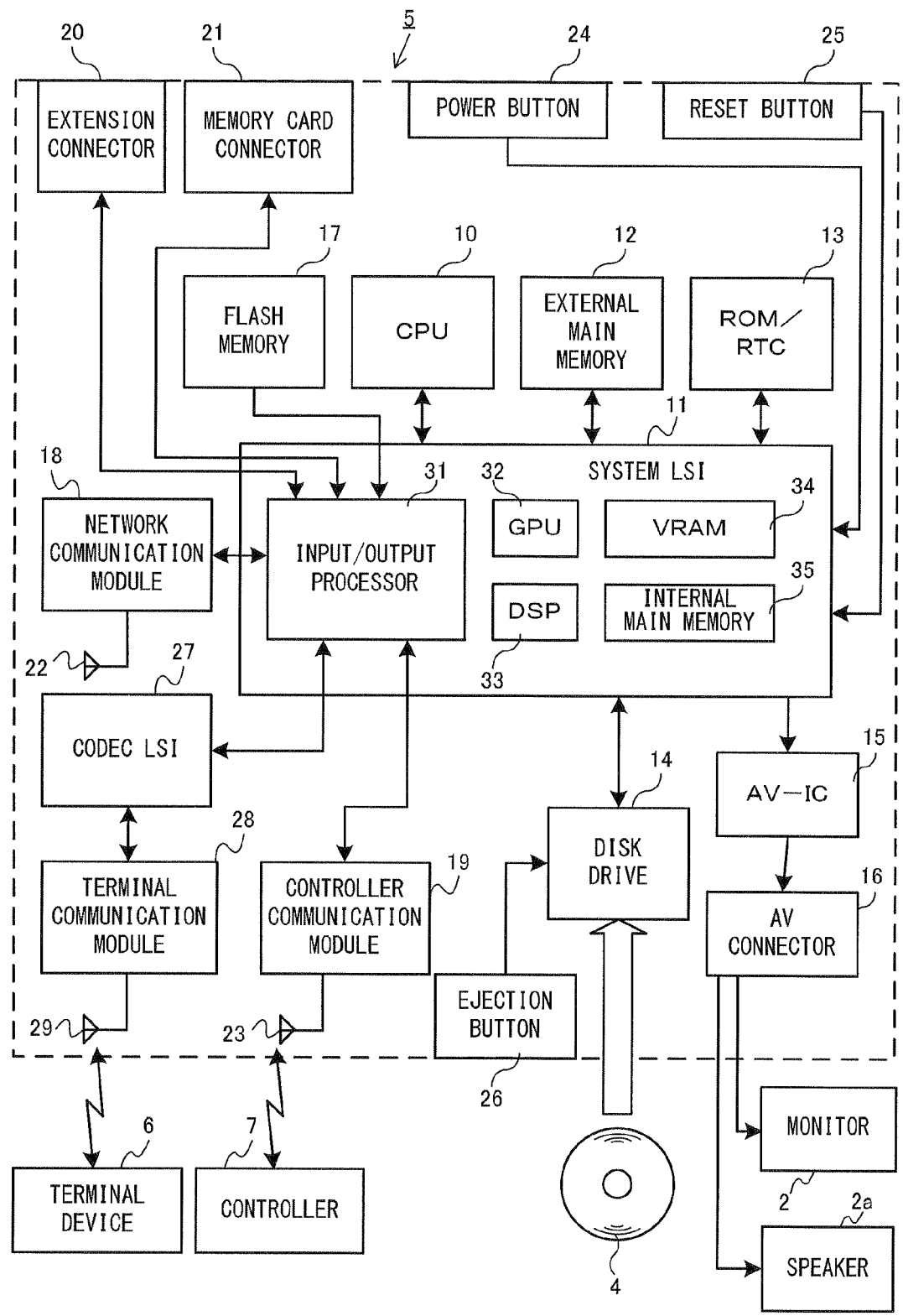
FIG. 2 is a block diagram showing a non-limiting example of an internal configuration of a game apparatus body 5.
Figure 3A:
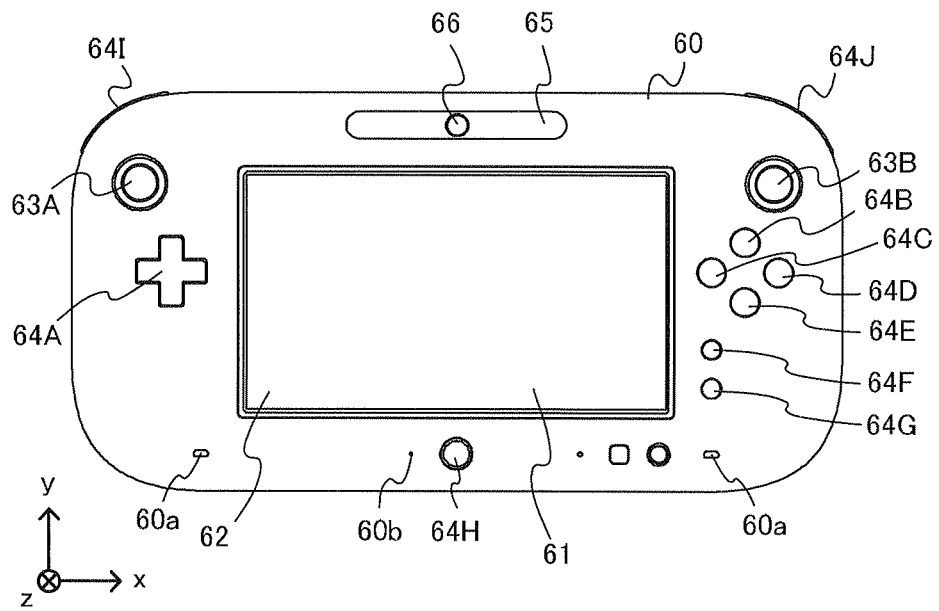
FIG. 3A shows a non-limiting example of a front view of a terminal device 6.
Figure 3B:
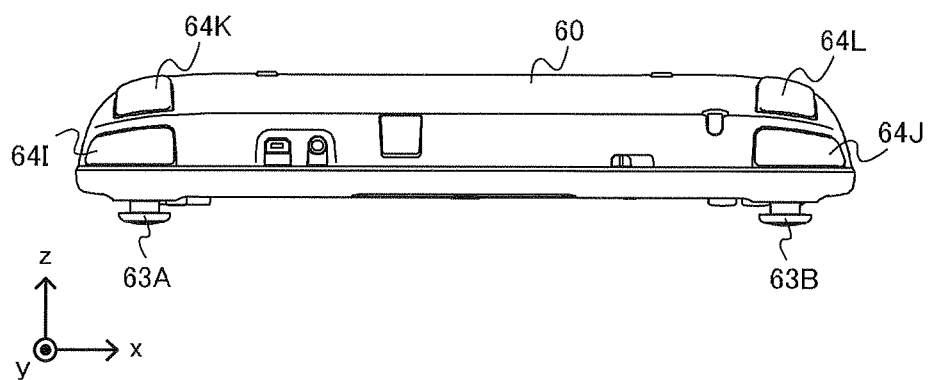
FIG. 3B shows a non-limiting example of a top view of the terminal device 6.
Figure 3C:
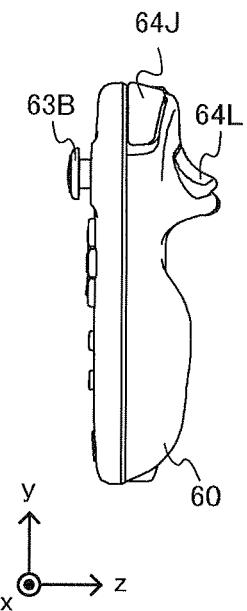
FIG. 3C shows a non-limiting example of a right side view of the terminal device 6.
Figure 3D:
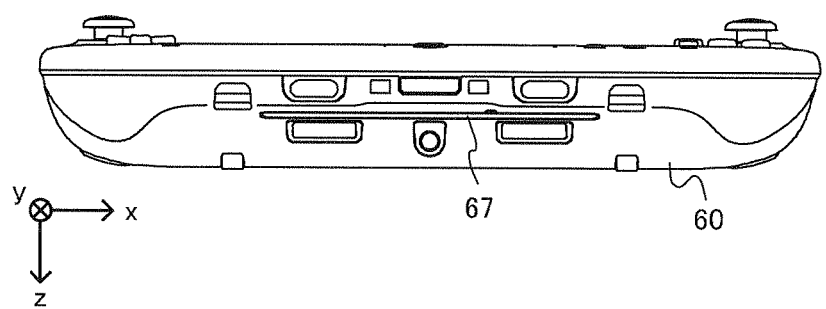
FIG. 3D shows a non-limiting example of a bottom view of the terminal device 6.

Next, with reference to FIG. 2, an internal structure of the game apparatus body 5 will be described. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

The external main memory 12, which is a volatile memory, is used as a work region and a buffer region for the CPU 10.

The system LSI 11 includes an input/output processor (I/O processor) 31, a GPU (Graphics Processor Unit) 32, a DSP (Digital Signal Processor) 33, a VRAM (Video RAM) 34, and an internal main memory 35.

The GPU 32 generates an image in accordance with a graphics command (draw command) supplied from the CPU 10. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image," and the game image to be displayed on the terminal device 6 may be referred to as a "terminal game image."

The DSP 33, serving as an audio processor, generates sound data by using sound data or sound waveform (tone quality) data stored in the internal main memory 35 or the external main memory 12. In the exemplary embodiment, similarly to the game images, both a game sound to be outputted from the loudspeakers 2a of the monitor 2 and a game sound to be outputted from the loudspeakers of the terminal device 6 may be generated. Hereinafter, the game sound to be outputted from the monitor 2 may be referred to as a "monitor game sound," and the game sound to be outputted from the terminal device 6 may be referred to as a "terminal game sound."

The I/O processor 31 is connected to a flash memory 17, a network communication module 18, a controller communication module 19, an extension connector 20, a memory card connector 21, and a codec LSI 27. The codec LSI 27 is connected to a terminal communication module 28.

Through the network communication module 18 and an antenna 22, the game apparatus body 5 is connected to a network such as the Internet so as to communicate with external information processing apparatuses (for example, other game apparatuses or various servers).

Furthermore, the game apparatus body 5 can receive operation data (controller operation data) from the controller 7. That is, the I/O processor 31 receives, via the antenna 23 and the controller communication module 19, the controller operation data or the like transmitted from the controller 7, and stores (temporarily) the data in a buffer region of the internal main memory 35 or the external main memory 12.

The game apparatus body 5 is capable of transmitting image data, sound data or the like to the terminal device 6. The I/O processor 31 outputs, to the codec LSI 27, image data (terminal game image) generated by the GPU 32 and sound data (terminal game sound) generated by the DSP 33. The codec LSI 27 performs a predetermined compression process on the image data and the sound data supplied from the I/O processor 31. The image data and the sound data compressed by the codec LSI 27 are transmitted by the terminal communication module 28 to the terminal device 6 via an antenna 29. The image data and the sound data may be transmitted in an uncompressed form.

Furthermore, game apparatus body 5 can receive various data (the terminal operation data, the image data, and the sound data) from the terminal device 6. The respective data transmitted from the terminal device 6 are received by the terminal communication module 28 via the antenna 29. The image data and sound data transmitted from the terminal device 6 have been subjected to a compression process. Accordingly, these image data and sound data are subjected to a decompression process by the codec LSI 27. The decompressed data are outputted to the I/O processor 31. The terminal operation data, which has been received by the terminal communication module 28, is outputted to the I/O processor 31 via the codec LSI 27. The I/O processor 31 stores (temporarily) the data received from the terminal device 6 in the buffer region of the internal main memory 35 or the external main memory 12.

The game apparatus body 5 includes a power button 24, a reset button 25, an insertion slot through which the optical disc 4 is inserted/ejected, an eject button 26 for ejecting the optical disc 4 from the insertion slot of the game apparatus body 5, and the like.

Next, the configuration of the terminal device 6 will be described with reference to FIG. 3A to FIG. 5.

As shown in FIG. 3A to FIG. 3D, the terminal device 6 includes a housing 60 which generally has a horizontally long plate-like rectangle shape.

Figure 4:
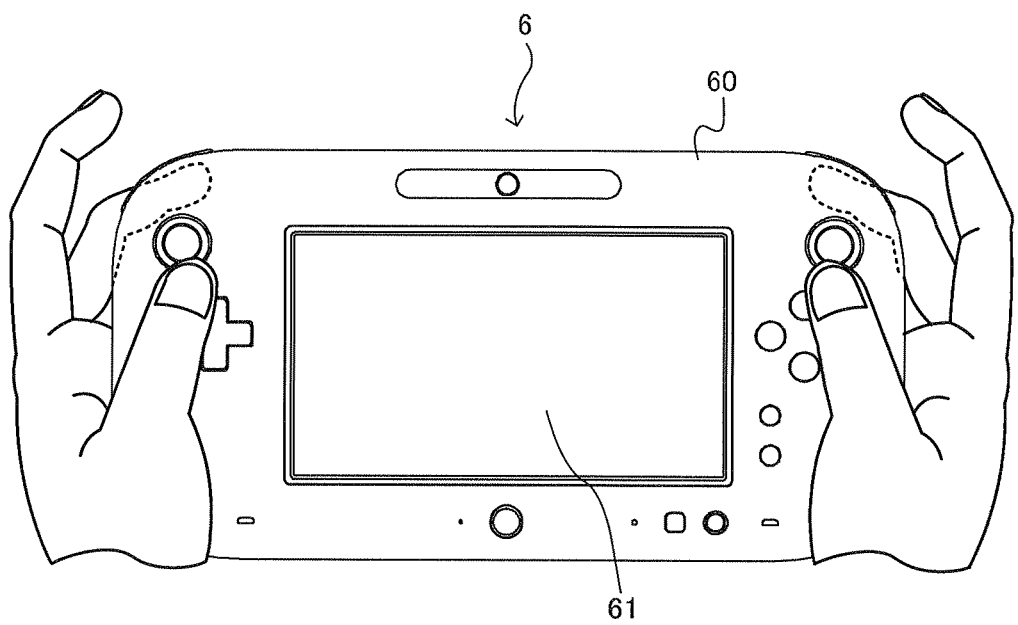
FIG. 4 shows a non-limiting example of a manner in which a user holds the terminal device 6.

The terminal device 6 includes the LCD 61 on a front surface of the housing 60. As shown in FIG. 4, the user, holding the housing 60 at portions to the right and left of the LCD 61, is allowed to move the terminal device 6 while viewing a screen of the LCD 61.

As shown in FIG. 3A to FIG. 3D, the terminal device 6 includes, as operation means, the touch panel 62 on the screen of the LCD 61, and two analog sticks 63A and 63B, and a plurality of operation buttons 64A to 64L.

In addition, a marker section 65, a camera 66, loudspeaker holes 60a, and a microphone hole 60b are disposed on the front surface of the housing 60 of the terminal device 6.

The terminal device 6 includes an extension connector 67 for connecting other devices to the terminal device 6.

Figure 5:
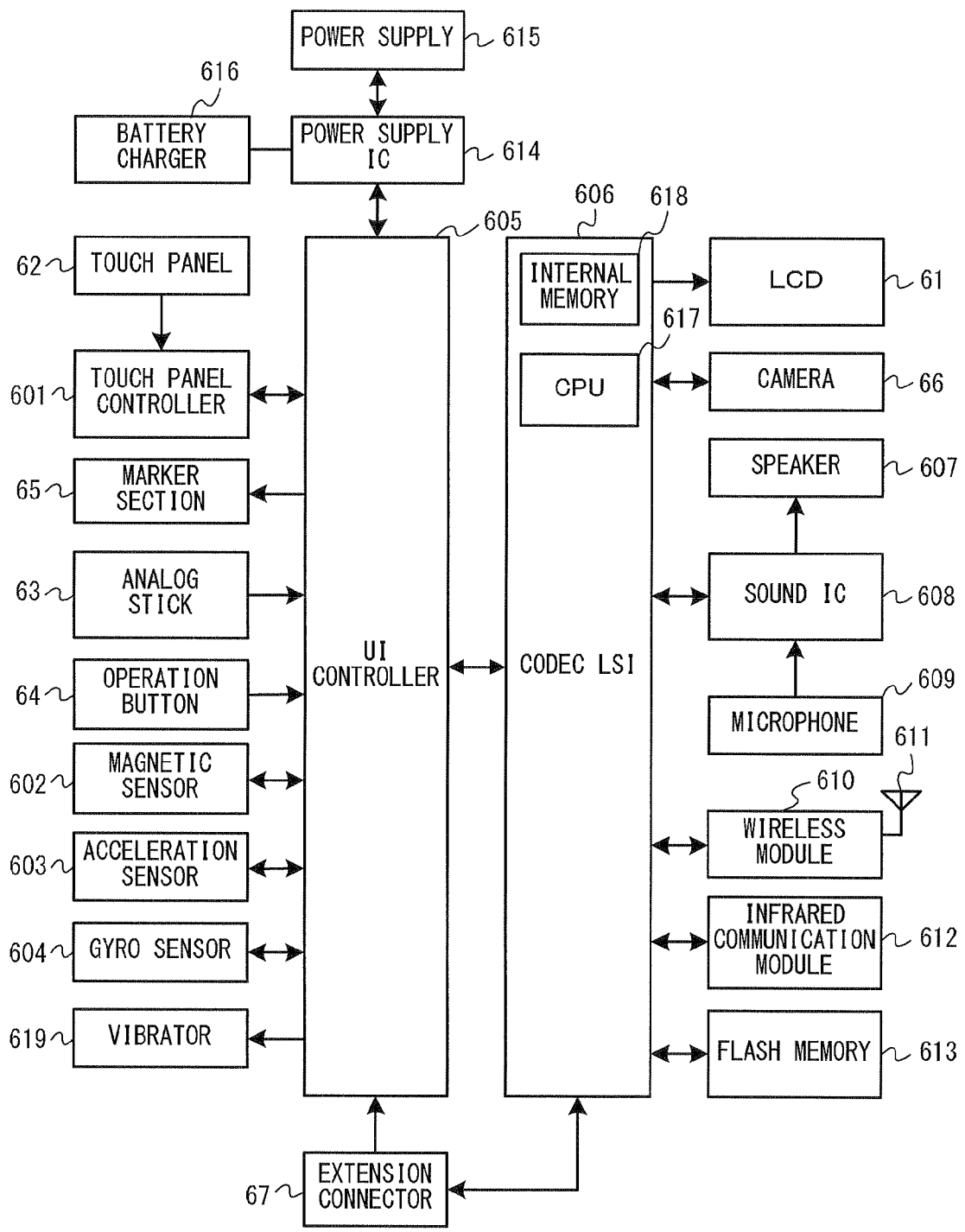
FIG. 5 is a block diagram show a non-limiting example of an internal configuration of the terminal device 6.

Next, an internal structure of the terminal device 6 will be described with reference to FIG. 5. As shown in FIG. 5, the terminal device 6 includes, in addition to the components shown in FIG. 3A to FIG. 3D, a touch panel controller 601, a magnetic sensor 602, an acceleration sensor 603, the gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

A battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable.

The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62.

The analog stick 63 outputs, to the UI controller 605, stick data representing an amount and direction of the sliding (or tilting) of the stick part. The operation button 64 outputs, to the UI controller 605, operation button data representing an input status of each of the operation buttons 64A to 64L (whether or not the operation button is pressed).

The magnetic sensor 602 detects the magnitude and direction of a magnetic field to detect an orientation. Orientation data representing the detected orientation is outputted to the UI controller 605.

The acceleration sensor 603 detects the magnitudes of linear accelerations in all three axial directions (xyz axial directions shown in (a) of FIG. 3A to FIG. 3D). Acceleration data representing the detected accelerations is outputted to the UI controller 605.

The gyro sensor 604 is provided inside the housing 60. The gyro sensor 604 detects the angular velocities around all the three axes (the above-described xyz axes). Angular velocity data representing the detected angular velocities is outputted to the UI controller 605.

The UI controller 605 outputs, to the codec LSI 606, the operation data (hereinafter, referred to as terminal operation data) including the touch position data, the stick data, the operation button data, the orientation data, the acceleration data and the angular velocity data, which have been received from the respective components.

The codec LSI 606 is a circuit for performing a compression process on data to be transmitted to the game apparatus body 5, and a decompression process on data transmitted from the game apparatus body 5. The codec LSI 606 includes a CPU 617 and an internal memory 618. Although the terminal device 6 is configured not to perform a game process, the terminal device 6 may execute a minimum program for managing the terminal device 6 or for a minimum program for communication. For example, a program stored in the flash memory 613 may be loaded into the internal memory 618 and executed by the CPU 617 when the terminal device 6 is powered on, thereby starting up the terminal device 6. One region of the internal memory 618 may be used as a VRAM for the LCD 61.

The codec LSI 606 transmits the image data from the camera 66, the sound data from the microphone 609, and the terminal operation data from the UI controller 605 to the game apparatus body 5 via the wireless module 610. In the exemplary embodiment, the codec LSI 606 subjects the image data and the sound data to a compression process.

Next, a general outline of a game executed by the game system 1 of the exemplary embodiment will be described with reference to FIG. 6 to FIG. 13.

The game system 1 of the exemplary embodiment can execute four types of games, i.e., a first game to a fourth game. In each of the games, a user (main player) plays the game by operating the terminal device 6 while viewing at least one of the game images, i.e., a monitor game image displayed on the monitor 2 and a terminal game image displayed on the LCD 61 of the terminal device 6. In addition, while the main player is playing the game, a user other than the main player can assist or obstruct a game played by the main player, by operating the controller 7 and influencing the game played by the main player. It should be noted that, in the following description, the user operating the terminal device 6 is referred to as the main player, and the user operating the controller 7 is referred as a sub player.

In the following, general outlines of each of the games of the first game to the fourth game will be described.

First Game

Figure 6:
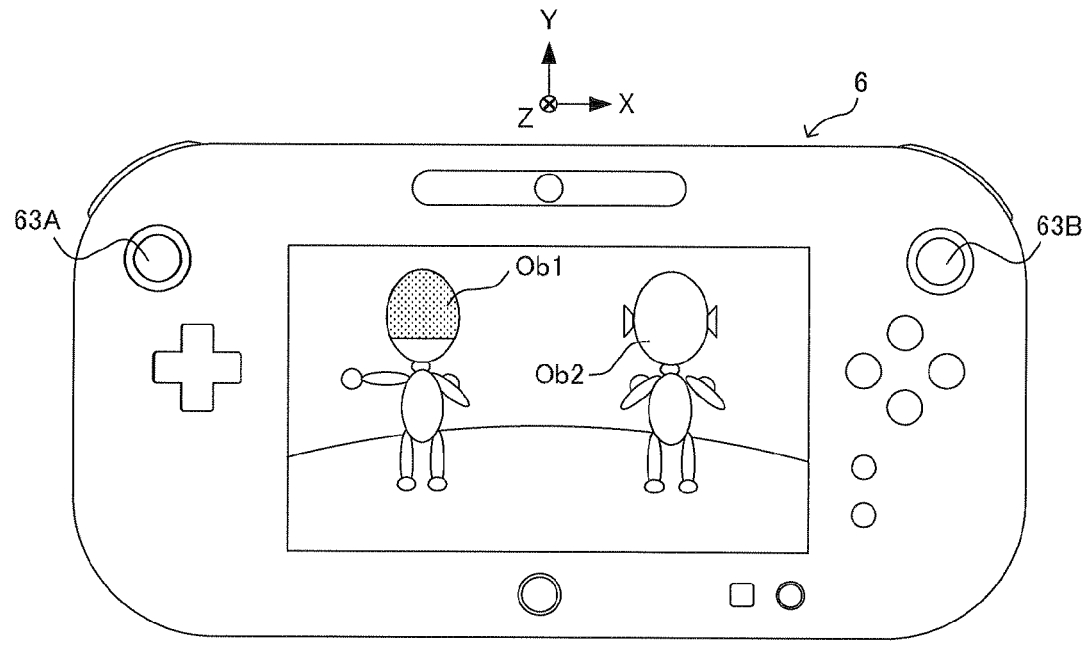
FIG. 6 shows a non-limiting example of a terminal game image of a first game.
Figure 7:
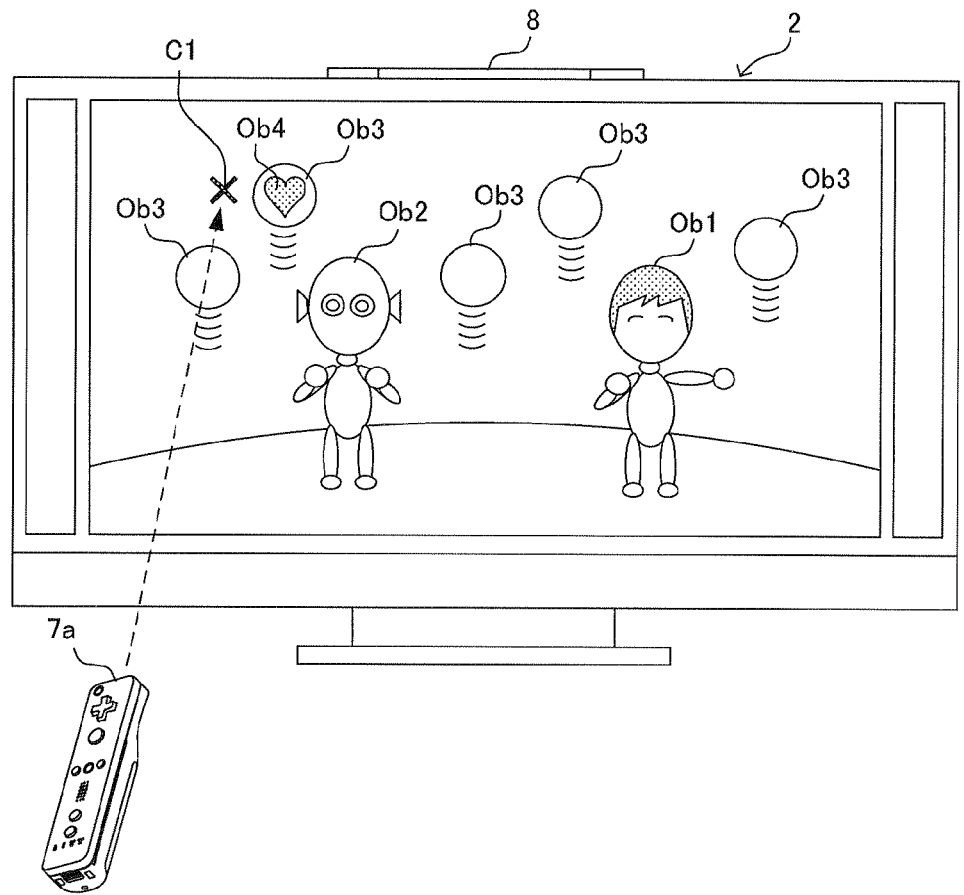
FIG. 7 shows a non-limiting example of a monitor game image of the first game.

Firstly, a general outline of the first game will be described with reference to FIG. 6 and FIG. 7. In the first game, a player object Ob1 and a model object Ob2 are arranged on a stage set in a virtual game space. As shown in FIG. 6, a game image of a view of these objects from behind is displayed on the LCD 61 of the terminal device 6. Furthermore, as shown in FIG. 7, a game image of a view of these objects from the front is displayed on the monitor 2.

The main player can control the player object Ob1 by operating the terminal device 6. Specifically, the main player can control the left hand of the player object Ob1 by operating the analog stick 63A, control the right hand of the player object Ob1 by operating the analog stick 63B, and tilt an upper half of the body of the player object Ob1 in the right hand direction or the left hand direction by tilting the terminal device 6 clockwise or counterclockwise, respectively, using the Z-axis as a center.

The model object Ob2 is automatically controlled by a computer so as to take a series of predetermined poses at predetermined timings. For example, the model object Ob2 takes three poses in synchronization with whistle sounds (e.g., three sounds of "peep," "peep," and "peep" at a 1-second interval) outputted from the loudspeakers 2a. For example, the model object Ob2 projects the right hand in the upward direction in synchronization with the first whistle sound, tilts the upper half of the body to the left side in synchronization with the second whistle sound, and projects the left hand in the leftward direction in synchronization with the third whistle sound.

After a certain amount of time (e.g., 1 second later) from the end of the model object Ob2 taking the series of poses, the main player controls the player object Ob1 so as to take the series of poses identical to those by the model object Ob2 in synchronization with the whistle sounds (e.g., three sounds of "peep," "peep," and "peep" at a 1-second interval) that are outputted again from the loudspeakers 2a.

At the beginning of the game, three lives are given to the player object Ob1, and every time a mistake is made in taking a pose, the number of lives is reduced by 1. When the number of lives becomes 0, the game is over.

While the main player is playing the first game, another user can assist the game played by the main player, as the sub player.

When the main player makes a fine play (e.g., when the main player causes the player object Ob1 to take the correct pose at a perfect timing), as shown in FIG. 7, a plurality of bubble objects Ob3 appear in the virtual game space, and fly upward. A life object Ob4 is included in either one of the plurality of bubble objects Ob3.

The sub player can point any position on the screen of the monitor 2 by using the controller 7 (the controller 7a in the example in FIG. 7) as a pointing device. As previously described, the position pointed by the sub player on the screen of the monitor 2 is calculated based on a position of the marker 8 in an image captured by the imaging section provided on the controller 7. A cursor C1 is displayed at the position pointed by the sub player on the screen of the monitor 2.

The sub player can break a bubble object Ob3, by performing a shooting operation (e.g., an operation of pressing a specific operation button provided on the controller 7) in a state where the cursor C1 is overlaid on any one of the bubble objects Ob3. If the sub player can break a bubble object Ob3 including a life object Ob4 before the bubble object Ob3 disappears out of the screen, the player object Ob1 can acquire the life object Ob4. As a result, the number of lives of the player object Ob1 increases (recovers) by 1.

As described above, in the first game, when the main player is playing the game using the game system 1, another user can assist the game played by the main player by breaking a bubble object displayed on the monitor 2 by operating the controller 7, instead of simply viewing the game image displayed on the monitor 2. As a result, the other user will not be bored while the main player is playing the game.

Furthermore, when compared to having another user to simply view the game image displayed on the monitor 2, conversation between the main player and the other user can be further stimulated.

In addition to the game image (terminal game image) being displayed on the LCD 61 of the terminal device 6, the game image (monitor game image) is also displayed on the monitor 2 that is separate from the terminal device 6, and thereby the sub player can break a bubble object Ob3 while viewing the monitor game image. Although the LCD 61 of the terminal device 6 is extremely difficult to watch for a user other than the main player, the monitor 2 that is separate from the terminal device 6 is easy to watch for a user other than the main player, and thereby fine operability is provided for a user other than the main player.

Furthermore, since the sub player is not essential for playing the first game, the main player can enjoy the first game even if there are no sub players.

In addition, since the performance of the sub player's operation does not directly influence the result of the game played by the main player (i.e., even if the sub player fails to break a bubble object Ob3 including a life object Ob4, that would not become a direct cause for a game over), users other than the main player can casually participate in the game as a sub player.

Second Game

Figure 8:
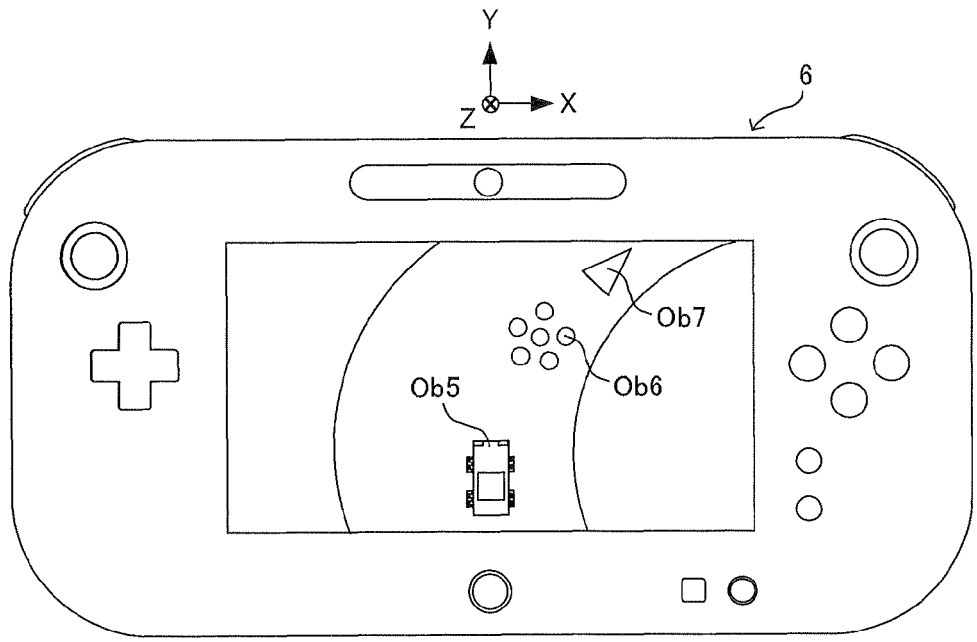
FIG. 8 shows a non-limiting example of a terminal game image of a second game.
Figure 9:
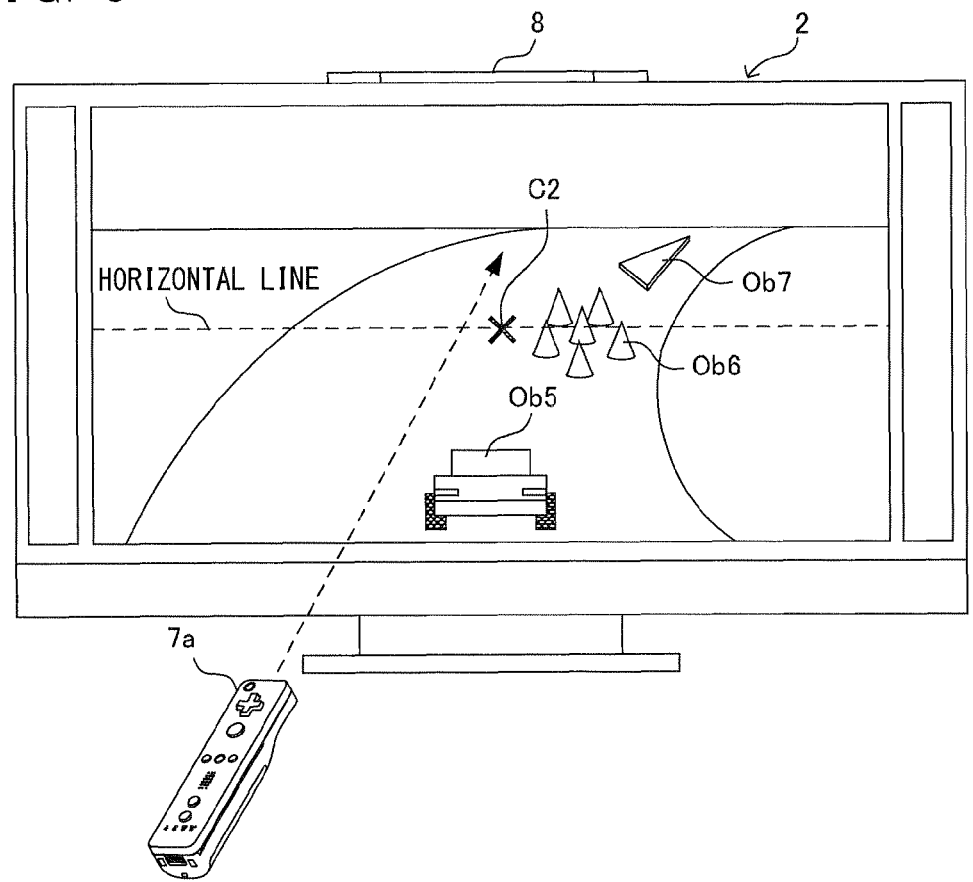
FIG. 9 shows a non-limiting example of a monitor game image of the second game.

Next, a general outline of the second game will be described with reference to FIG. 8 and FIG. 9. In the second game, a player object Ob5 is arranged on a course set in a virtual game space. As shown in FIG. 8, a game image of a view of the player object Ob5 from right above is displayed on the LCD 61 of the terminal device 6. Furthermore, as shown in FIG. 9, a game image of a view of the player object Ob5 from behind is displayed on the monitor 2.

The player object Ob5 is controlled by a computer so as to move on the course at a predetermined speed, and the main player can control the player object Ob5 by operating the terminal device 6. Specifically, the main player can steer the player object Ob5 leftward or rightward by rotating the terminal device 6 using the Y-axis as a center. The leftward or rightward steering the player object Ob5 may be performed by rotating the terminal device 6 clockwise or counterclockwise using the Z-axis as a center.

Obstacle objects Ob6 and an acceleration object Ob7 are arranged at predetermined positions on the course. When the player object Ob5 passes through an obstacle object Ob6, the player object Ob5 decelerates. When the player object Ob5 passes through the acceleration object Ob7, the player object Ob5 accelerates. Therefore, in order to further shorten a finish time of the course, the main player has to steer the player object Ob5 so as not to pass through an obstacle object Ob6 as much as possible, but to pass through the acceleration object Ob7 as much as possible.

While the main player is playing the second game, another user can assist or obstruct the game played by the main player, as the sub player.

The sub player can point any position on a predetermined horizontal line (a chain line in FIG. 9) on the screen of the monitor 2 by using the controller 7 (the controller 7a in the example in FIG. 9) as a pointing device. The position on the horizontal line pointed by the sub player is calculated by perpendicularly projecting, onto the horizontal line, the position on the screen calculated based on a position of the marker 8 in the image captured by the imaging section provided on the controller 7. A cursor C2 is displayed at the position pointed by the sub player on the screen of the monitor 2.

The sub player can remove an object, by performing a shooting operation (e.g., an operation of pressing a specific operation button provided on the controller 7) in a state where the cursor C2 is overlaid on an object (obstacle objects Ob6, acceleration object Ob7) other than the player object Ob5.

The sub player can assist the game played by the main player by removing an obstacle object Ob6. For example, in FIG. 9, if the sub player can remove the obstacle objects Ob6, the main player can drive along the inner side of the curve without decelerating the player object Ob5 and drive over the acceleration object Ob7, and thereby can largely shorten the finish time.

Conversely, the sub player can also obstruct the game played by the main player by removing the acceleration object Ob7.

As described above, in the second game, when the main player is playing the game using the game system 1, another user can assist or obstruct the game played by the main player by removing an object (obstacle objects Ob6, acceleration object Ob7) on the course displayed on the monitor 2 by operating the controller 7, instead of simply viewing the game image displayed on the monitor 2. As a result, the other user will not be bored while the main player is playing the game.

Furthermore, when compared to having the other user to simply view the game image displayed on the monitor 2, conversation between the main player and the other user can be further stimulated.

In addition to the game image (terminal game image) being displayed on the LCD 61 of the terminal device 6, the game image (monitor game image) is also displayed on the monitor 2 that is separate from the terminal device 6, and thereby the sub player can remove an object while viewing the monitor game image. Although the LCD 61 of the terminal device 6 is extremely difficult to watch for a user other than the main player, the monitor 2 that is separate from the terminal device 6 is easy to watch for a user other than the main player, and thereby fine operability is provided for a user other than the main player.

Furthermore, since the sub player is not essential for playing the second game, the main player can enjoy the second game even if there are no sub players.

In addition, since the performance of the sub player's operation does not directly influence the result of the game played by the main player (i.e., even if the sub player fails to remove an obstacle object Ob6, that would not become a direct cause for a game over), users other than the main player can casually participate in the game as a sub player.

Third Game

Figure 10:
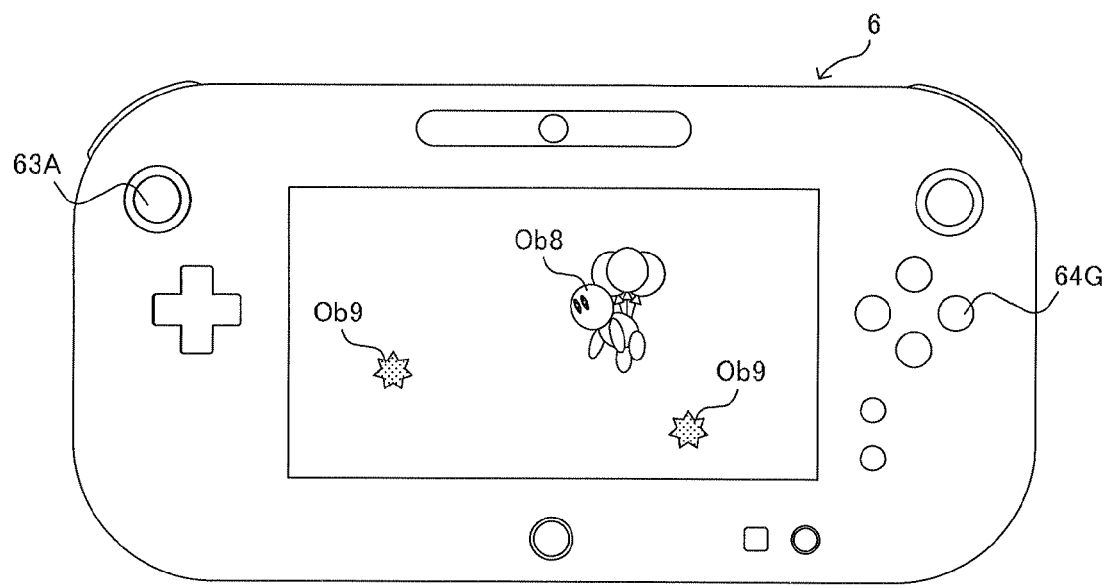
FIG. 10 shows a non-limiting example of a terminal game image of a third game.
Figure 11:
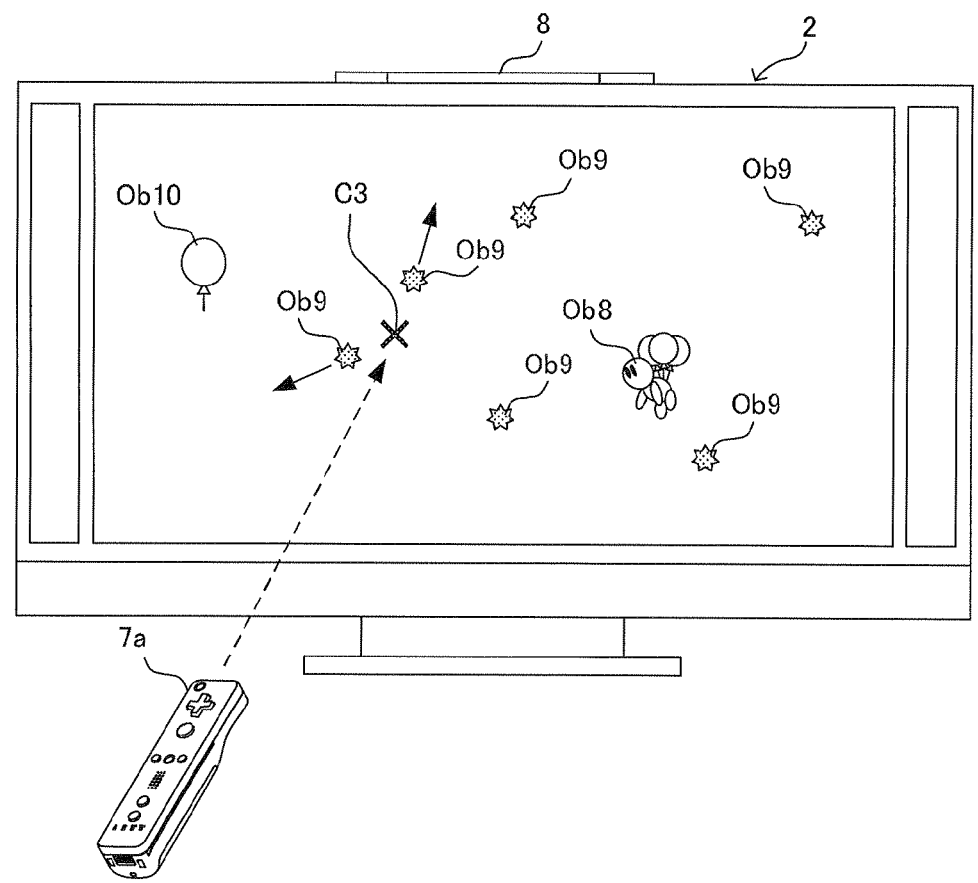
FIG. 11 shows a non-limiting example of a monitor game image of the third game.

Next, a general outline of the third game will be described with reference to FIG. 10 and FIG. 11. In the third game, a player object Ob8 is arranged in mid-air of a virtual game space. As shown in FIG. 10, a game image of a view of the player object Ob8 from a horizontal direction is displayed on the LCD 61 of the terminal device 6. Furthermore, as shown in FIG. 11, a game image of a view of the player object Ob8 from a horizontal direction is also displayed on the monitor 2. However, a range of the virtual game space displayed on the monitor 2 is wider than a range of the virtual game space displayed on the LCD 61 of the terminal device 6.

The main player can control the player object Ob8 by operating the terminal device 6. Specifically, by performing a slide operation (an operation of sliding a pen or finger while keeping it in contact with the touch panel 62), the main player can accelerate the player object Ob8 in the slide direction. Gravity is constantly acting upon the player object Ob8 in a downward direction of the screen, and the main player can provide acceleration to the player object Ob8 in the opposite direction of gravity (i.e., screen upward direction) by performing the slide operation in the screen upward direction. The control of the player object Ob8 is merely one example, and acceleration in an inputted direction may be provided by operating an analog stick A. Furthermore, acceleration in a direction opposite to gravity may be provided by pressing the operation button 64G.

Obstacle objects Ob9 and balloon objects Ob10 are arranged at predetermined positions in the virtual game space. When the player object Ob8 makes contact with an obstacle object Ob9, the player object Ob8 crashes and the game is over. When the player object Ob8 makes contact with a balloon object Ob10, a predetermined score is added to a game score.

While the main player is playing the third game, another user can assist or obstruct the game played by the main player, as the sub player.

The sub player can point any position on the screen of the monitor 2 by using the controller 7 (the controller 7a in the example in FIG. 11) as a pointing device. As previously described, the position pointed by the sub player on the screen of the monitor 2 is calculated based on a position of the marker 8 in an image captured by the imaging section provided on the controller 7. A cursor C3 is displayed at the position pointed by the sub player on the screen of the monitor 2.

By performing a shooting operation (e.g., an operation of pressing a specific operation button disposed on the controller 7) in a state where the cursor C3 is positioned in the vicinity of objects (obstacle objects Ob9, balloon objects Ob10) other than the player object Ob8, the sub player can blow away (i.e., move the respective objects for predetermined distances in directions away from the cursor C3 as shown by arrows in FIG. 11) the objects in the vicinity of the cursor C3, as if an air cannon has been discharged toward the position indicated by the cursor C3.

By moving the obstacle objects Ob9 away from a pathway of the player object Ob8, the sub player can assist the game played by the main player. For example, in FIG. 11, if the sub player can move the obstacle objects Ob9 away from the pathway (a route for reaching a balloon object Ob10) of the player object Ob8, the main player can easily cause the player object Ob8 to reach a balloon object Ob10 without making contact with an obstacle object Ob9.

Conversely, the sub player can obstruct the game played by the main player by moving an obstacle object Ob9 onto the pathway of the player object Ob8 or moving a balloon object Ob10 away from the player object Ob8.

As described above, in the third game, when the main player is playing the game using the game system 1, another user can assist or obstruct the game played by the main player by moving an object (obstacle objects Ob9, balloon objects Ob10) displayed on the monitor 2 by operating the controller 7, instead of simply viewing the game image displayed on the monitor 2. As a result, the other user will not be bored while the main player is playing the game.

Furthermore, when compared to having the other user to simply view the game image displayed on the monitor 2, conversation between the main player and the other user can be further stimulated.

In addition to the game image (terminal game image) being displayed on the LCD 61 of the terminal device 6, the game image (monitor game image) is also displayed on the monitor 2 that is separate from the terminal device 6, and thereby the sub player can move an object while viewing the monitor game image. Although the LCD 61 of the terminal device 6 is extremely difficult to watch for the user other than the main player, the monitor 2, which is separate from the terminal device 6, is easy to watch for the user other than the main player, and thereby fine operability is provided for the user other than the main player.

Furthermore, since the sub player is not essential for playing the third game, the main player can enjoy the third game even if there are no sub players.

In addition, since the performance of the sub player's operation does not directly influence the result of the game played by the main player (i.e., even if the sub player fails to distance an obstacle object Ob9 from the pathway of the player object Ob8, that would not become a direct cause of a game over), users other than the main player can casually participate in the game as a sub player.

Fourth Game

Figure 12:
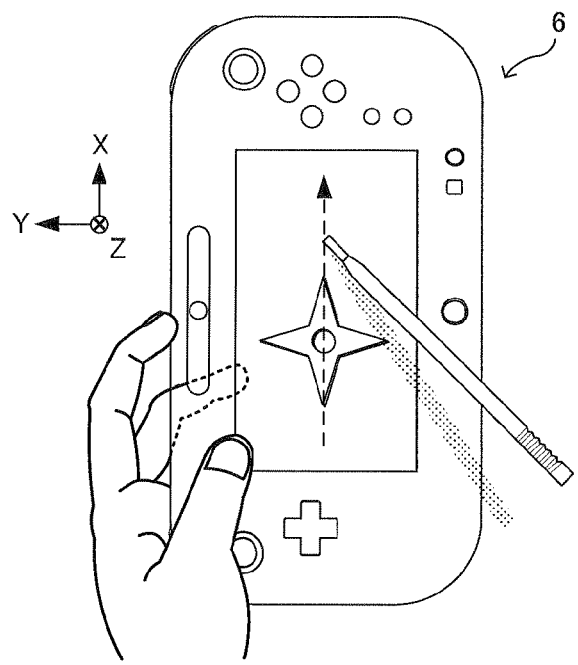
FIG. 12 shows a non-limiting example of a terminal game image of a fourth game.
Figure 13:
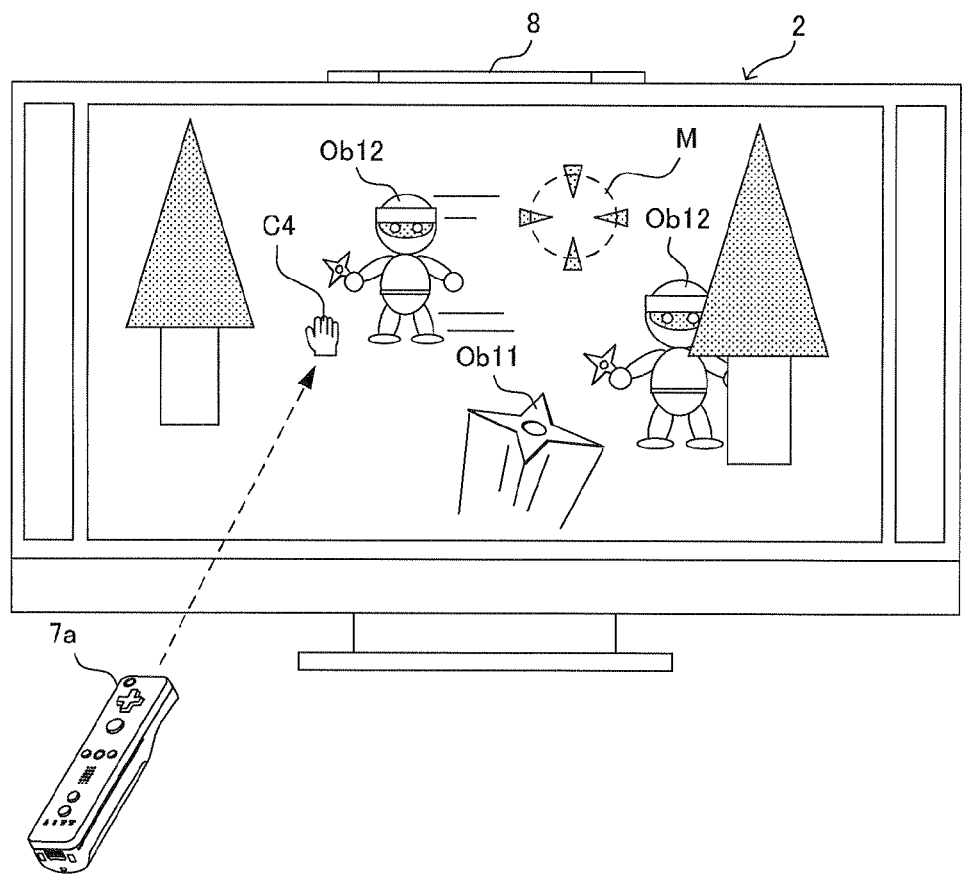
FIG. 13 shows a non-limiting example of a monitor game image of the fourth game.

Next, a general outline of the fourth game will be described with reference to FIG. 12 and FIG. 13. In the fourth game, enemy objects Ob12 appear in a virtual game space. As shown in FIG. 12, an image of a throwing star is displayed on the LCD 61 of the terminal device 6. Furthermore, as shown in FIG. 13, a game image showing the virtual game space from a first-person viewpoint is displayed on the monitor 2.

The main player can shoot a throwing star object Ob11 in the virtual game space by operating the terminal device 6. Specifically, by holding the terminal device 6 as shown in FIG. 12 and performing a slide operation (an operation of sliding a pen or finger while keeping it in contact with the touch panel 62) in a positive direction of the X-axis, the main player can launch a throwing star object Ob11. When the terminal device 6 is held in a direction opposite to that in FIG. 12 (i.e., a direction in which the positive direction of the X-axis of the terminal device 6 is pointing the main player, not the monitor 2), the throwing star object Ob11 may be launched by performing a slide operation in the negative direction of the X-axis. Furthermore, the main player can change a launch direction of the throwing star object Ob11 by changing an attitude of the terminal device 6. As shown in FIG. 13, an aim mark M indicating a rough launch direction of the throwing star object Ob11 is displayed on the monitor 2, and when the main player changes the attitude of the terminal device 6, the display position of the aim mark M changes accordingly.

The enemy objects Ob12 are automatically controlled by the computer and move within the virtual game space in accordance with a predetermined algorithm. By using the aim mark M as a reference, the main player launches the throwing star object Ob11 toward an enemy object Ob12, and if the throwing star object Ob11 hits the enemy object Ob12, a predetermined score is added to the game score.

While the main player is playing the fourth game, another user can assist the game played by the main player, as the sub player.

The sub player can point any position on the screen of the monitor 2 by using the controller 7 (the controller 7a in the example in FIG. 11) as a pointing device. As previously described, the position pointed by the sub player on the screen of the monitor 2 is calculated based on a position of the marker 8 in an image captured by the imaging section provided on the controller 7. A cursor C4 having a hand shape is displayed at the position pointed by the sub player on the screen of the monitor 2.

By performing a gripping operate (e.g., an operation of pressing a specific operation button disposed on the controller 7) in a state where the cursor C4 is overlaid on an enemy object Ob12, the sub player can halt the enemy object Ob12 where it stands until the sub player cancels the gripping operation. As a result, when compared to a case where the enemy object Ob12 is moving, the main player can easily hit the enemy object Ob12 by the throwing star object Ob11. An object (e.g., a throwing star or a bomb etc., that is to be thrown toward the player by an enemy attacking the player) other than the enemy object Ob12 may be halted by the gripping operation.

As described above, in the fourth game, when the main player is playing the game using the game system 1, another user can assist the game played by the main player by halting an the enemy object Ob12 displayed on the monitor 2 by operating the controller 7, instead of simply viewing the game image displayed on the monitor 2. As a result, the other user will not be bored while the main player is playing the game.

Furthermore, when compared to having the other user to simply view the game image displayed on the monitor 2, conversation between the main player and the other user can be further stimulated.

Furthermore, since the sub player is not essential for playing the fourth game, the main player can enjoy the fourth game even if there are no sub players.

In addition, since the performance of the sub player's operation does not directly influence the result of the game played by the main player (i.e., even if the sub player fails to halt an enemy object Ob12, that would not become a direct cause for a game over), users other than the main player can casually participate in the game as a sub player.

Next, detailed action of the game system 1 to achieve the game will be described with reference to FIG. 14 to FIG. 19.

FIG. 14 shows one example of various data stored in the external main memory 12 of the game apparatus body 5 when the game is executed.

A game program D1 is a program that causes the CPU 10 of the game apparatus body 5 to execute a game process for achieving the game. The game program D1 is loaded, for example, from the optical disc 4 to the external main memory 12.

Game data D2 is data used when executing the game program D1, and includes game data for the first game, game data for the second game, game data for the third game, and game data for the fourth game.

The game data for the first game includes, for example, data representing exterior views of respective objects (player object Ob1, model object Ob2, bubble objects Ob3, life object Ob4), data representing positions of the respective objects in the virtual game space, data representing attitudes of respective parts (right hand, left hand, upper half of the body) of the player object Ob1, data representing attitudes of respective parts of the model object Ob2, data representing a display position of the cursor C1, and data representing the number of lives of the player object Ob1.

The game data for the second game includes, for example, data representing exterior views of respective objects (player object Ob5, obstacle objects Ob6, acceleration object Ob7), data representing positions of the respective objects in the virtual game space, data representing a display position of the cursor C2, data representing attitude and speed of the player object Ob5, and data representing finish time.

The game data for the third game includes, for example, data representing exterior views of respective objects (player object Ob8, obstacle objects Ob9, balloon objects Ob10), data representing positions of the respective objects in the virtual game space, data representing a display position of the cursor C3, data representing attitude and speed of the player object Ob8, and data representing the game score.

The game data for the fourth game includes, for example, data representing exterior views of respective objects (throwing star object Ob11, the enemy objects Ob12), data representing positions of the respective objects in the virtual game space, data representing display positions of the aim mark M and the cursor C4, data representing attitude and speed of the throwing star object Ob11, and data representing the game score.

Controller operation data D3 is data that is periodically transmitted from the controller 7, and includes, as described above, the operation button data, the marker coordinate data, the acceleration data, and the angular velocity data. When a plurality of users other than the main player are to simultaneously participate in the game as sub players, controller operation data from a plurality of controllers 7 are stored in the external main memory 12 so as to be distinguishable from each other.

Terminal operation data D4 is data that is periodically transmitted from the terminal device 6, and includes, as described above, the touch position data, the stick data, the operation button data, the orientation data, the acceleration data, and the angular velocity data.

Next, a flow of the game process executed by the CPU 10 of the game apparatus body 5 based on the game program D1 will be described with reference to flowcharts in FIG. 15 to FIG. 19.

It should be noted that, although diagrammatic representation is omitted in the flowcharts in FIG. 15 to FIG. 19, a terminal game image and a monitor game image are generated in the game apparatus body 5 at a predetermined cycle (e.g., 1/60 second), and are outputted to the terminal device 6 and the monitor 2, respectively.

Figure 15:
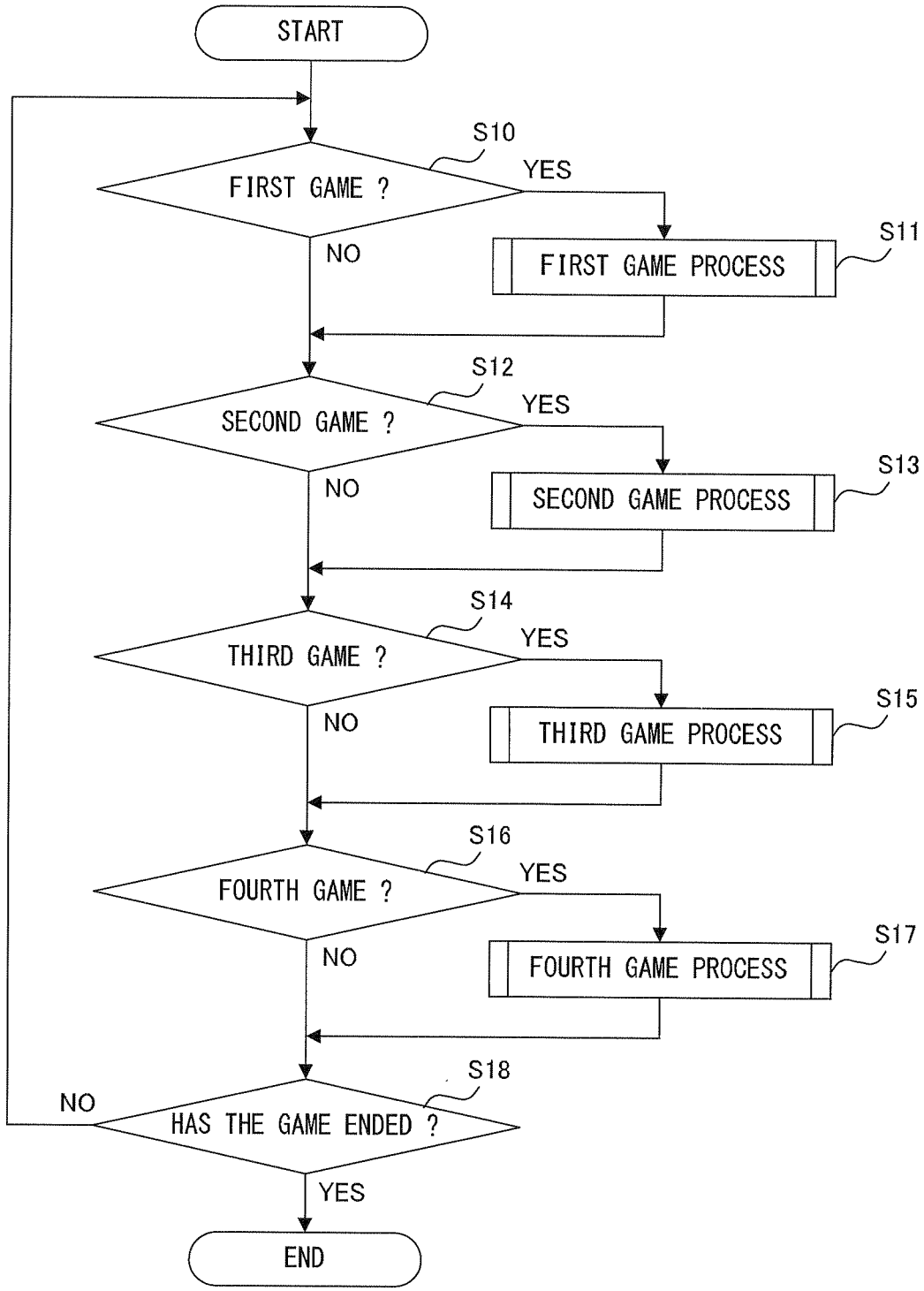
FIG. 15 shows a non-limiting example of a flowchart showing a flow of a game process based on a game program D1.

When execution of the game program D1 is initiated, first, at step S10 in FIG. 15, the CPU 10 determines whether an initiation instruction for the first game has been inputted by the main player, based on the terminal operation data D4. If the initiation instruction for the first game has been inputted, the process advances to step S11, and if not, the process advances to step S12.

At step S11, the CPU 10 executes a first game process. Details of the first game process will be described later.

At step S12, the CPU 10 determines whether an initiation instruction for the second game has been inputted by the main player, based on the terminal operation data D4. If the initiation instruction for the second game has been inputted, the process advances to step S13, and if not, the process advances to step S14.

At step S13, the CPU 10 executes a second game process. Details of the second game process will be described later.

At step S14, the CPU 10 determines whether an initiation instruction for the third game has been inputted by the main player, based on the terminal operation data D4. If the initiation instruction for the third game has been inputted, the process advances to step S15, and if not, the process advances to step S16.

At step S15, the CPU 10 executes a third game process. Details of the third game process will be described later.

At step S16, the CPU 10 determines whether an initiation instruction for the fourth game has been inputted by the main player, based on the terminal operation data D4. If the initiation instruction for the fourth game has been inputted, the process advances to step S17, and if not, the process advances to step S18.

At step S17, the CPU 10 executes a fourth game process. Details of the fourth game process will be described later.

At step S18, the CPU 10 determines whether a game ending instruction has been inputted by the main player, based on the terminal operation data D4. If the game ending instruction has been inputted, the execution of the game program D1 is ended, and if not, the process returns to step S10.

Figure 16:
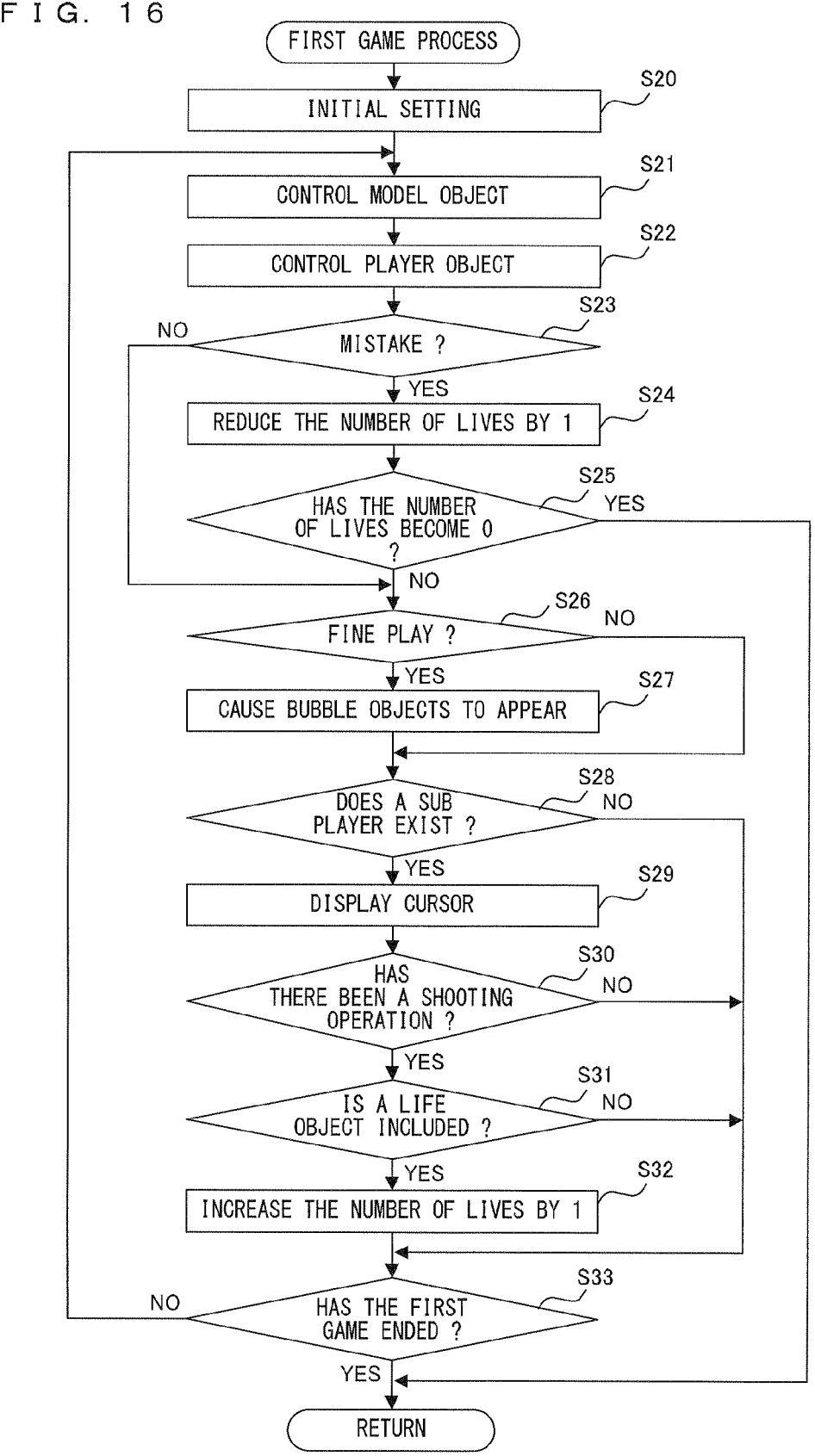
FIG. 16 shows a non-limiting example of a flowchart showing a flow of a first game process.

Next, with reference to the flowchart in FIG. 16, details of the previously described first game process at step S11 will be described.

At step S20, the CPU 10 sets up initial settings. Those conducted in the initial settings include: a process for setting, to initial positions, the positions of the player object Ob1 and the model object Ob2 in the virtual game world; a process for setting the number of lives of the player object Ob1 to an initial value (e.g., 3); and a process for setting, to initial positions, the position of the virtual camera (viewpoint) for generating the terminal game image and the position of the virtual camera (viewpoint) for generating the monitor game image.

At step S21, the CPU 10 controls the model object Ob2. Specifically, the CPU 10 controls the attitudes of each of the parts (right hand, left hand, upper half of the body) of the model object Ob2 such that the model object Ob2 takes a series predetermined poses at a predetermined timing.

At step S22, the CPU 10 controls the player object Ob1 based on the terminal operation data D4. Specifically, the CPU 10 controls the attitudes of the right hand and left hand of the player object Ob1 based on the stick data included in the terminal operation data D4, and controls the attitude of the upper half of the body of the player object Ob1 based on the acceleration data (or angular velocity data) included in the terminal operation data D4.

At step S23, the CPU 10 determines whether the main player has made a mistake, based on the attitudes of each of the parts of the player object Ob1 and the timing at which these attitudes have been changed. If the main player has made a mistake, the process advances to step S24, and if not, the process advances to step S26.

At step S24, the CPU 10 reduces the number of lives of the player object Ob1 by 1.

At step S25, the CPU 10 determines whether the number of lives of the player object Ob1 has become 0. If the number of lives of the player object Ob1 has become 0, the first game process ends, and if not, the process advances to step S26.

At step S26, the CPU 10 determines whether the main player has made a fine play based on the attitudes of each of the parts of the player object Ob1 and the timing at which those attitudes have been changed. If the main player has made a fine play, the process advances to step S27, and if not, the process advances to step S28.

At step S27, the CPU 10 causes multiple bubble objects Ob3 to appear in the virtual game space. A life object Ob4 is included in any one of these multiple bubble objects Ob3.

At step S28, the CPU 10 determines whether a sub player exists. If a sub player exists, the process advances to step S29, and if not, the process advances to step S33. For example, whether a sub player exists may be determined based on the controller operation data D3. Specifically, when a predetermined participation initiating operation (e.g., an operation of simultaneously pressing two specific operation buttons disposed on the controller 7) is performed on the controller 7, the CPU 10 may determine that a user other than the main player has started participating in the game as a sub player. Further, when a predetermined participation ending operation (e.g., an operation of simultaneously pressing the above described two specific operation buttons once again) is performed on the controller 7, the CPU 10 may determine that the sub player has ended his/her participation to the game.

At step S29, the CPU 10 calculates a position on the screen of the monitor 2 at which the sub player is pointing based on the controller operation data D3 (more specifically, the marker coordinate data), and displays the cursor C1 on the position. Immediately after the above described participation initiating operation has been performed, in order to easily understandably indicate that a user other than the main player has started participating the game as a sub player, the cursor C1 may be displayed in a display mode that is different from ordinary. In addition, immediately after the above described participation ending operation has been performed, in order to easily understandably indicate that the sub player has ended his/her participation to the game, the cursor C1 may be displayed in a display mode different from ordinary.

At step S30, the CPU 10 determines whether a shooting operation has been performed by the sub player, based on the controller operation data D3 (more specifically, the operation button data). If the shooting operation has been performed, the process advances to step S31, and if not, the process advances to step S33.

At step S31, the CPU 10 determines whether the sub player has been able to break a bubble object Ob3 including a life object Ob4, by comparing the display position of the cursor C1 and the current position of the bubble object Ob3 including the life object Ob4. If the sub player has been able to break the bubble object Ob3 including the life object Ob4, the process advances to step S32, and if not, the process advances to step S33.

At step S32, the CPU 10 increases (recovers) the number of lives of the player object Ob1 by 1.

At step S33, the CPU 10 determines whether the first game has ended. If the first game has ended, the first game process ends, and if not, the process returns to step S21.

Figure 17:
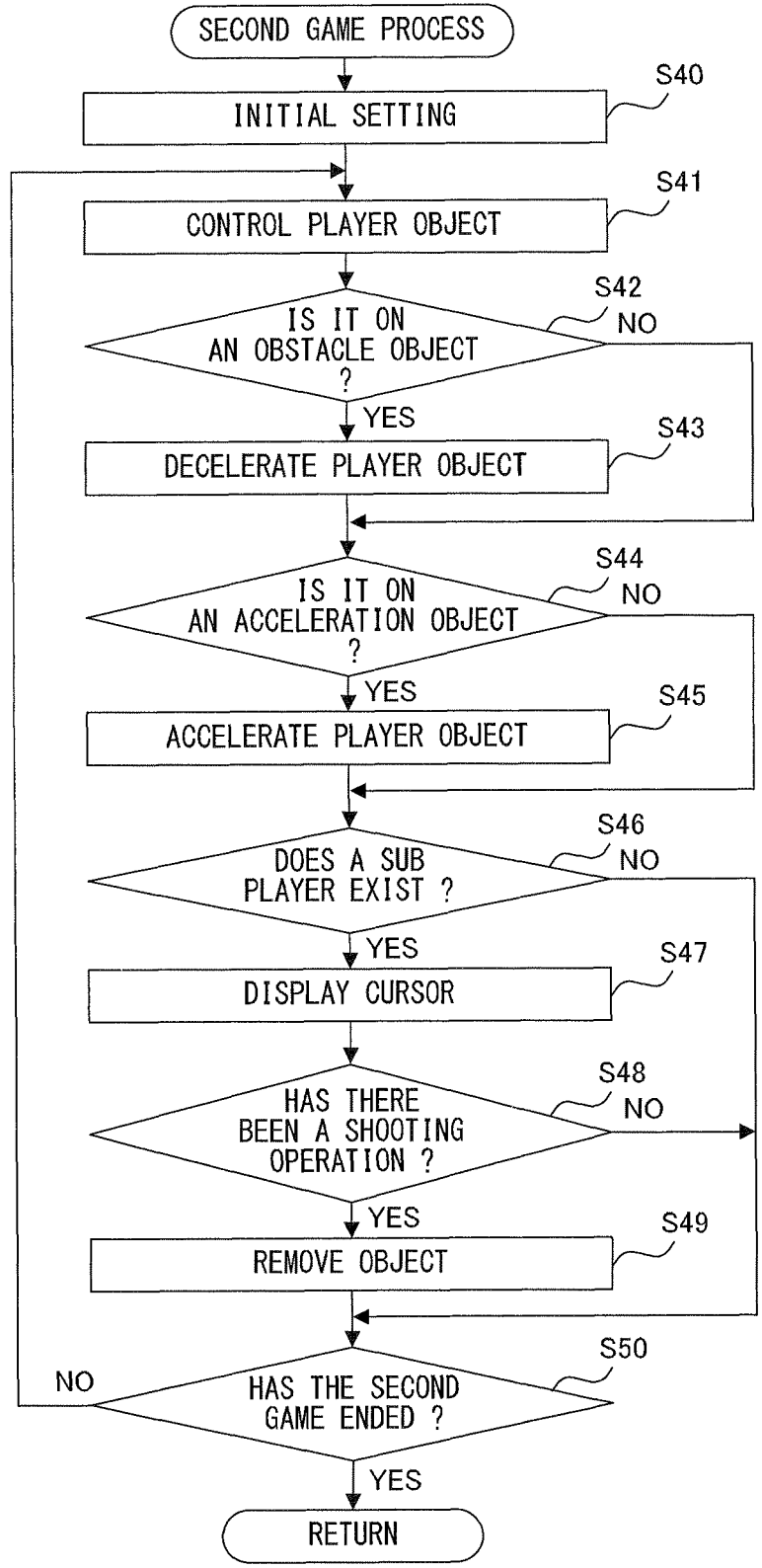
FIG. 17 shows a non-limiting example of a flowchart showing a flow of a second game process.

Next, with reference to the flowchart in FIG. 17, details of the previously described second game process at step S13 will be described.

At step S40, the CPU 10 sets up initial settings. Those conducted in the initial settings include: a process for setting the position of the player object Ob5 in the virtual game world to an initial position; and a process for setting the position of the virtual camera (viewpoint) for generating the terminal game image and the position of the virtual camera (viewpoint) for generating the monitor game image to initial positions.

At step S41, the CPU 10 controls the player object Ob5 based on the terminal operation data D4. Specifically, the CPU 10 moves the player object Ob5 at a predetermined speed, and steers the player object Ob5 based on the angular velocity data (or orientation data) included in the terminal operation data D4. Although detailed descriptions will be omitted, the CPU 10 also controls the position and attitude of the virtual camera for generating the terminal game image, in response to the position and attitude of the player object Ob5. The same applies for the virtual camera for generating the monitor game image.

At step S42, the CPU 10 determines whether the player object Ob5 is positioned on an obstacle object Ob6, by comparing the position of the player object Ob5 and the position of the obstacle objects Ob6 in the virtual game space. If the player object Ob5 is positioned on the obstacle object Ob6, the process advances to step S43, and if not, the process advances to step S44.

At step S43, the CPU 10 decelerates the player object Ob5.

At step S44, the CPU 10 determines whether the player object Ob5 is positioned on the acceleration object Ob7, by comparing the position of the player object Ob5 and the position of the acceleration object Ob7 in the virtual game space. If the player object Ob5 is positioned on the acceleration object Ob7, the process advances to step S45, and if not, the process advances to step S46.

At step S45, the CPU 10 accelerates the player object Ob5.

At step S46, the CPU 10 determines whether a sub player exists. If a sub player exists, the process advances to step S47, and if not, the process advances to step S50. As described above, whether a sub player exists may be determined based on, for example, the controller operation data D3.

At step S47, the CPU 10 calculates a position (the position on the predetermined horizontal line described above) pointed by the sub player on the screen of the monitor 2, based on the controller operation data D3 (more specifically, the marker coordinate data), and displays the cursor C2 on the position.

At step S48, the CPU 10 determines whether a shooting operation has been performed by the sub player, based on the controller operation data D3 (more specifically, the operation button data). If the shooting operation has been performed, the process advances to step S49, and if not, the process advances to step S50.

At step S49, the CPU 10 compares the display position of the cursor C2 and the display positions of respective objects (obstacle objects Ob6, acceleration object Ob7) arranged on the course, and removes an object (the obstacle objects Ob6 or the acceleration object Ob7) existing in the vicinity of the cursor C2.

At step S50, the CPU 10 determines whether the second game has ended. If the second game has ended, the second game process ends, and if not, the process returns to step S41.

Figure 18:
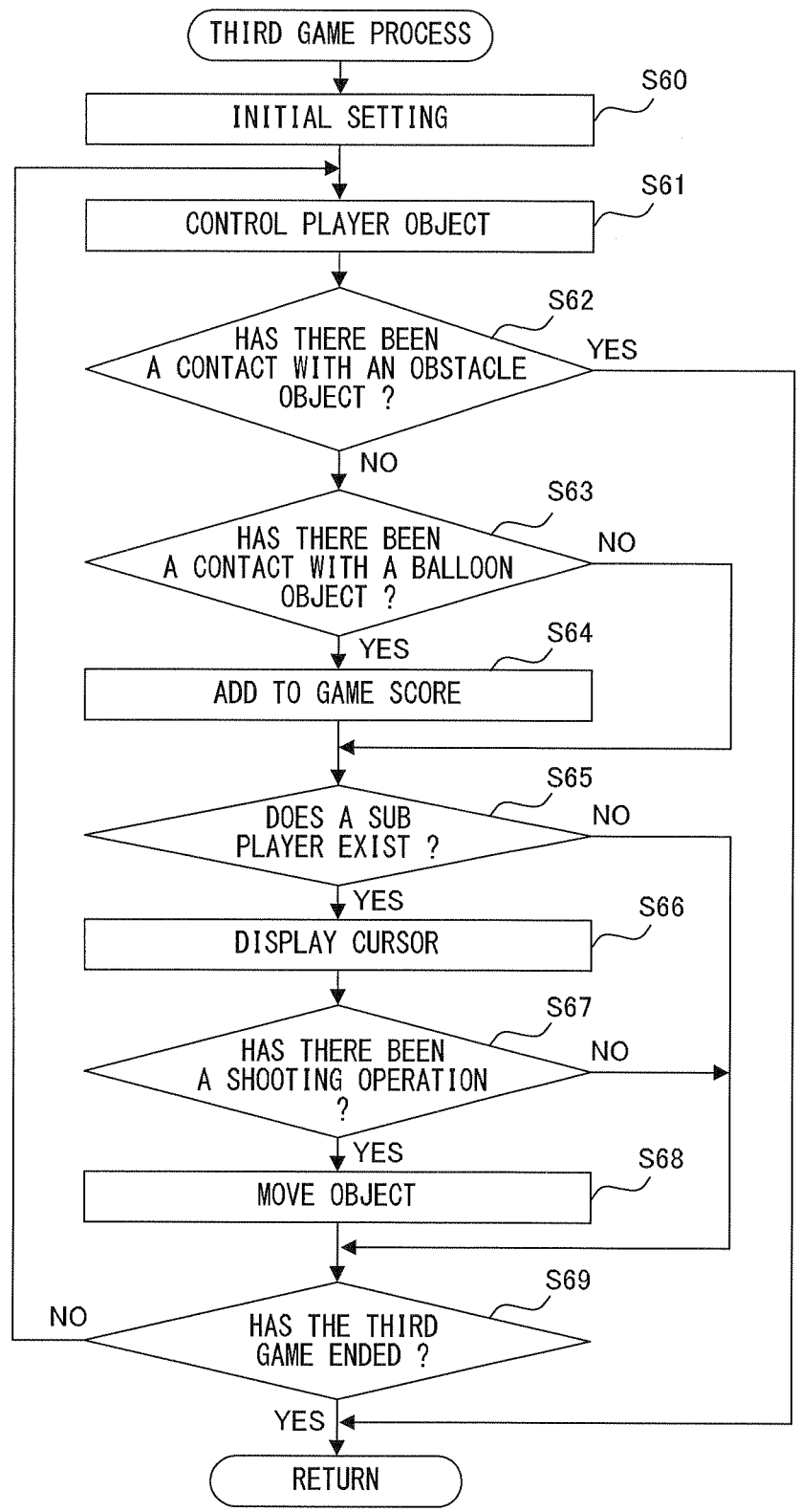
FIG. 18 shows a non-limiting example of a flowchart showing a flow of a third game process.

Next, with reference to the flowchart in FIG. 18, details of the previously described third game process at step S15 will be described.

At step S60, the CPU 10 sets up initial settings. Those conducted in the initial settings include: a process for setting the position of the player object Ob8 in the virtual game world to an initial position; a process for setting the game score to an initial value (e.g., 0); and a process for setting the position of the virtual camera (viewpoint) for generating the terminal game image and the position of the virtual camera (viewpoint) for generating the monitor game image to initial positions.

At step S61, the CPU 10 controls the player object Ob8 based on the terminal operation data D4. Specifically, the CPU 10 detects the slide operation performed on the touch panel 62 based on the touch position data included in the terminal operation data D4, accelerates the player object Ob8 in the slide direction based on the stick data that is included in the terminal operation data D4 and that depends on the slide operation, and also accelerates the player object Ob8 in the downward direction of the screen based on gravitational acceleration that is configured in advance.

At step S62, the CPU 10 determines whether the player object Ob8 has made contact with an obstacle object Ob9, by comparing the position of the player object Ob8 and the position of the obstacle objects Ob9 in the virtual game space. If the player object Ob8 has made contact with the obstacle object Ob9, the third game process ends, and if not, the process advances to step S63.

At step S63, the CPU 10 determines whether the player object Ob8 has made contact with a balloon object Ob10 by comparing the position of the player object Ob8 and the position of the balloon object Ob10 in the virtual game space. If the player object Ob8 has made contact with the balloon object Ob10, the process advances to step S64, and if not, the process advances to step S65.

At step S64, the CPU 10 adds a predetermined score to the game score.

At step S65, the CPU 10 determines whether a sub player exists. If a sub player exists, the process advances to step S66, and if not, the process advances to step S69. As described above, whether a sub player exists may be determined based on, for example, the controller operation data D3.

At step S66, the CPU 10 calculates a position pointed by the sub player on the screen of the monitor 2, based on the controller operation data D3 (more specifically, the marker coordinate data), and displays the cursor C3 at the position.

At step S67, the CPU 10 determines whether a shooting operation has been performed by the sub player, based on the controller operation data D3 (more specifically, the operation button data). If the shooting operation has been performed, the process advances to step S68, and if not, the process advances to step S69.

At step S68, the CPU 10 compares the display position of the cursor C3 and the display positions of the respective objects (obstacle objects Ob9, balloon objects Ob10) arranged in the virtual game space, and moves objects (obstacle objects Ob9 or balloon objects Ob10) existing within a predetermined range having the cursor C3 located in a center thereof, in a direction away from the cursor C3.

At step S69, the CPU 10 determines whether the third game has ended. If the third game has ended, the third game process ends, and if not, the process returns to step S61.

Figure 19:
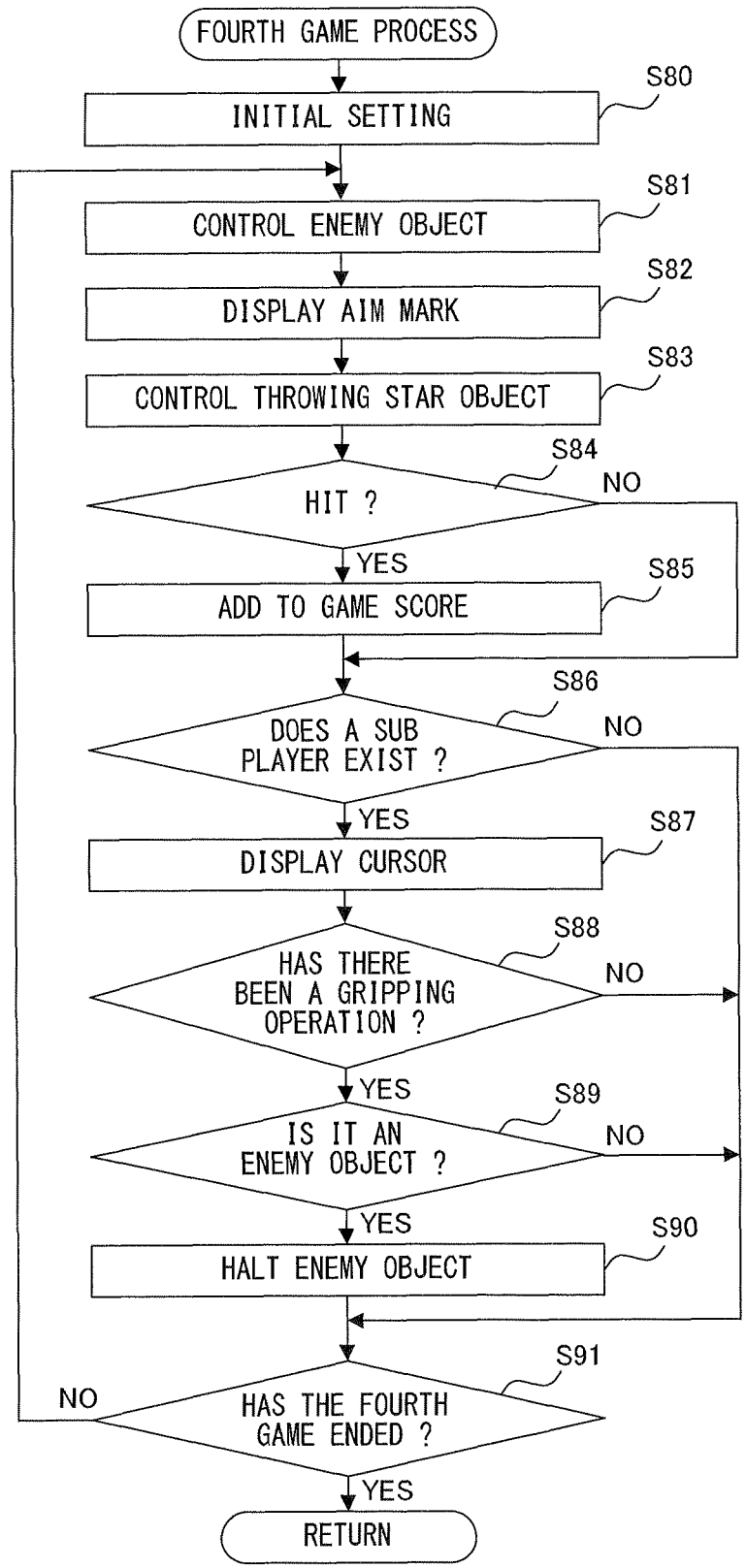
FIG. 19 shows a non-limiting example of a flowchart showing a flow of a fourth game process.

Next, with reference to the flowchart in FIG. 19, details of the previously described fourth game process at step S17 will be described.

At step S80, the CPU 10 sets up initial settings. Those conducted in the initial settings include: a process for setting the position of the enemy objects Ob12 in the virtual game world to initial positions; a process for setting the game score to an initial value (e.g., 0); and a process for setting the position of the virtual camera (viewpoint) for generating the monitor game image to an initial position.

At step S81, the CPU 10 controls the enemy object Ob12. Specifically, the CPU 10 moves the enemy object Ob12 in accordance with a predetermined algorithm.

At step S82, the CPU 10 displays the aim mark M based on the terminal operation data D4. Specifically, the CPU 10 displays the aim mark M at a position on the screen of the monitor 2 depending on the attitude of the terminal device 6, based on the acceleration data or the angular velocity data included in the terminal operation data D4.

At step S83, the CPU 10 controls the throwing star object Ob11 based on the terminal operation data D4. Specifically, the CPU 10 detects the slide operation performed on the touch panel 62 based on the touch position data included in the terminal operation data D4, and launches the throwing star object Ob11 at an initial velocity and to a launch direction depending on the slide operation. In addition, the CPU 10 moves the throwing star object Ob11 that has been launched so as to fly in a parabolic trajectory.

At step S84, the CPU 10 determines whether the throwing star object Ob11 has hit an enemy object Ob12 by comparing the position of the throwing star object Ob11 and the position of the enemy object Ob12 in the virtual game space. If the throwing star object Ob11 has hit the enemy object Ob12, the process advances to step S85, and if not, the process advances to step S86.

At step S85, the CPU 10 adds a predetermined score to the game score.

At step S86, the CPU 10 determines whether a sub player exists. If a sub player exists, the process advances to step S87, and if not, the process advances to step S91. As described above, whether a sub player exists may be determined based on, for example, the controller operation data D3.

At step S87, the CPU 10 calculates a position pointed by the sub player on the screen of the monitor 2, based on the controller operation data D3 (more specifically, the marker coordinate data), and displays the cursor C4 having a shape of a hand at the position.

At step S88, the CPU 10 determines whether a gripping operation has been performed by the sub player, based on the controller operation data D3 (more specifically, the operation button data). If a gripping operation has been performed, the process advances to step S89, and if not, the process advances to step S91.

At step S89, the CPU 10 compares the display position of the cursor C4 and the display position of the enemy object Ob12, and determines whether the enemy object Ob12 is displayed at the display position of the cursor C4. If the enemy object Ob12 is displayed at the display position of the cursor C4, the process advances to step S90, and if not, the process advances to step S91.

At step S90, the CPU 10 halts the enemy object Ob12 displayed at the display position of the cursor C4, where it stands.

At step S91, the CPU 10 determines whether the fourth game has ended. If the fourth game has ended, the fourth game process ends, and if not, the process returns to step S81.

With the exemplary embodiments described herein, while the main player is playing a game (in particular, a game that is supposed to be advanced by a single person) by operating the terminal device 6, another user can help or obstruct the game played by the main player by operating the controller 7. As a result, the other user will not be bored while a certain user is playing the game.

In addition, with the exemplary embodiments described herein, since the sub player can assist or obstruct the game played by the main player by operating the cursors C1 to C4 displayed on the monitor 2 that is separate from the terminal device 6, the sub player can have a fine operability.

It should be noted that the above described embodiment is merely one embodiment, and do not limit the scope of the present technology in any way.

For example, in the above described embodiment, a case has been described where there is a single sub player; however, in another embodiment, there may be multiple sub players. For example, when there are four sub players, the four sub players can operate the respective controllers 7a to 7d. In this case, four cursors corresponding to the controllers 7a to 7d may be displayed in the monitor game image in a mutually distinguishable manner (e.g., in different colors).

Furthermore, in the above described embodiment, a case has been described where there is a single main player; however, in another embodiment, there may be multiple main players. For example, when there are two main players, the two main players may operate two respective terminal devices 6. In this case, the two main players may control a first player object and a second player object by using the respective terminal devices 6.

Furthermore, in the above described embodiment, the positions of the cursors C1 to C4 are calculated based on the position of the marker 8 in the image captured by the imaging section provided on the controller 7; however, in another embodiment, the sub player may move the cursors C1 to C4 by using any input device such as a cross button, an analog stick, a touch panel, a mouse, or the like.

Furthermore, in the above described embodiment, an object is acquired, removed, moved, or halted when the sub player performs a shooting operation or a gripping operation; however, in another embodiment, the object may be acquired, removed, moved, or halted in response to the cursors C1 to C4 simply overlapping the object.

Furthermore, in the above described embodiment, the sub player can acquire, remove, move, or halt an object positioned at or in the vicinity of a pointed position; however, in another embodiment, the sub player may perform other processes (e.g., changing shapes, changing sizes, changing colors, etc.) on an object positioned at or in the vicinity of a pointed position.

Furthermore, in the above described embodiment, although the multiple processes shown in FIG. 15 to FIG. 19 are executed on a single computer (the CPU 10), in another embodiment, these multiple processes may be distributed and executed on multiple computers. Furthermore, in still another embodiment, one portion of these multiple processes may be achieved through hardware circuitry.

Furthermore, in the above described embodiment, although the multiple processes shown in FIG. 15 to FIG. 19 are executed on a single information processing apparatus (the game apparatus body 5), in another embodiment, these multiple processes may be distributed and executed on multiple information processing apparatuses (e.g., the game apparatus body 5 and a server device).

Furthermore, in the above described embodiment, although the game program D1 is provided to the game apparatus body 5 from the optical disc 4, in another embodiment, the game program D1 may be provided to the game apparatus body 5 from any other computer readable storage media (e.g., CD-ROM, semiconductor memory, and the like). Furthermore, in still another embodiment, the game program D1 may be stored in advance in a nonvolatile memory (the ROM/RTC 13, the flash memory 17) inside the game apparatus body 5. Furthermore, in still another embodiment, the game program D1 may be transmitted to the game apparatus body 5 from another information processing apparatus (game apparatus, server device).

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising at least a game apparatus and a first operation device,
   wherein the first operation device comprises one or more first operation receivers and a first display, and is configured to transmit first operation data based on an operation performed on the first operation receivers,
   wherein the game apparatus comprises:
      a game processor configured to control a first operation subject in a virtual space and conduct a game process, based on at least the first operation data;
      a first image generator configured to generate a first game image that is to be displayed on the first display, based on the game process; and
      a second image generator configured to, based on the game process, generate a second game image that is to be displayed on a second display that is separate from the first operation device,
   wherein the game apparatus is operable to additionally acquire second operation data from a second operation device that does not include a display,
   wherein the game processor is further configured to, during the game process and when the second operation data is acquired,
      control a second operation subject included in the virtual space based on the second operation data, and
      conduct a predetermined process on a predetermined object that is in the virtual space based on a position of the second operation subject, the redetermined object being different from the first operation subject, and
   wherein the first game image is a game image that includes the first operation subject but does not include the second operation subject.

2. The game system according to claim 1, wherein the second image generator is configured to generate, as the second game image, a game image that is different from the first game image.

3. The game system according to claim 2, wherein:
   the first image generator is configured to generate, as the first game image, an image that is a view of the virtual space from a first viewpoint; and
   the second image generator is configured to generate, as the second game image, an image that is a view of the virtual space from a second viewpoint that is different from the first viewpoint.

4. The game system according to claim 1, wherein the first image generator is configured to generate the first game image that includes the first operation subject.

5. The game system according to claim 1, wherein the second operation subject is a cursor.

6. The game system according to claim 1, wherein:
   the predetermined object is an item object; and
   the game processor is further configured to conduct an item acquiring process of acquiring the item object corresponding to the position of the second operation subject based on the second operation data, and change a predetermined parameter regarding the first operation subject based on the acquired item object.

7. The game system according to claim 1, wherein the game processor is further configured to move or remove the predetermined object corresponding to the position of the second operation subject, based on the second operation data.

8. The game system according to claim 7, wherein the predetermined object is an obstacle object that obstructs advance of the first operation subject.

9. The game system according to claim 1, wherein the game processor is configured to halt the predetermined object corresponding to the position of the second operation subject, based on the second operation data.

10. The game system according to claim 1, wherein a user operating the second operation device is able to assist a game played by a user operating the first operation device, by operating the second operation device and causing the game processor to conduct the predetermined process on the predetermined object.

11. The game system according to claim 1, wherein a user operating the second operation device is able to obstruct a game played by a user operating the first operation device, by operating the second operation device and causing the game processor to conduct the predetermined process on the predetermined object.

12. A game processing method of a game system including at least a game apparatus and a first operation device, the game processing method comprising:
   controlling, by the game apparatus, a first operation subject in a virtual space based on at least first operation data from the first operation device, the first operation data being reflecting an operation performed on the first operation device;
   conducting, by the game apparatus, a game process based on at least the first operation data;
   generating, by the game apparatus, a first game image that is to be displayed on a first display based on the game process, the first display being a display of the first operation device;
   generating, by the game apparatus, a second game image that is to be displayed on a second display based on the game process, the second display being separate from the first operation device;
   acquiring, by the game apparatus, second operation data from a second operation device that does not include a display;
   during the game process and when the second operation data is acquired, controlling, by the game apparatus, a second operation subject included in the virtual space based on the second operation data; and
   during the game process and when the second operation data is acquired, conducting, by the game apparatus, a predetermined process on a predetermined object that is in the virtual space based on a position of the second operation subject, the predetermined object being different from the first operation subject, wherein the first game image is a game image that includes the first operation subject but does not include the second operation subject.

13. A game apparatus used in a game system including at least the game apparatus and a first operation device, the game apparatus comprising:
a game processor configured to control a first operation subject in a virtual space and conduct a game process based on at least the first operation data from the first operation device, the first operation data being reflecting an operation performed on the first operation device;
a first image generator configured to generate a first game image that is to be displayed on a first display based on the game process, the first display being a display of the first operation device; and
a second image generator configured to generate a second game image that is to be displayed on a second display based on the game process, the second display being separate from the first operation device,
wherein the game apparatus is operable to additionally acquire second operation data from a second operation device that does not include a display,
wherein the game processor is further configured to, during the game process and when the second operation data is acquired,
control a second operation subject included in the virtual space based on the second operation data, and
conduct a predetermined process on a predetermined object that is in the virtual space based on a position of the second operation subject, the predetermined object being different from the first operation subject, and
wherein the first game image is a game image that includes the first operation subject but does not include the second operation subject.

14. A non-transitory computer-readable storage medium, having stored thereon a game program executed by a computer of a game apparatus of a game system including at least the game apparatus and a first operation device, the game program causing the computer to function as:
a game processor configured to control a first operation subject in a virtual space and conduct a game process based on at least the first operation data from the first operation device, the first operation data being reflecting an operation performed on the first operation device;
a first image generator configured to generate a first game image that is to be displayed on a first display based on the game process, the first display being a display of the first operation device; and
a second image generator configured to generate a second game image that is to be displayed on a second display based on the game process, the second display being separate from the first operation device,
wherein the game apparatus is operable to additionally acquire second operation data form a second operation device that does not include a display,
wherein the game processor is further configured to, during the game process and when the second operation data is acquired,
control a second operation subject included in the virtual space based on the second operation data, and
conduct a predetermined process on a predetermined object that is in the virtual space based on a position of the second operation subject, the predetermined object being different from the first operation subject, and wherein the first game image is a game image that includes the first operation subject but does not include the second operation subject.

15. A game processing method of a game apparatus of a game system, the game processing method comprising:
receiving, at the game apparatus, terminal operation data from a terminal device of the game system, the terminal operation data reflecting operations performed on the terminal device by a main player;
controlling, by the game apparatus, a player object in a virtual space and conducting a game process based on the terminal operation data, the terminal operation data comprising data specifying actions to be taken by the player object as inputted on the terminal device by the main player;
controlling, by the game apparatus, a non-player object in the virtual space during the game process, the non-player object being different from the player object, and the terminal operation data not including any data to control the non-player object;
generating, by the game apparatus, a terminal game image and a monitor game image based on the game process;
providing, from the game apparatus, the terminal game image to the terminal device, the terminal device including a terminal display;
providing, from the game apparatus, the monitor game image to a monitor of the game system, the monitor being separate from the terminal display;
receiving, at the game apparatus, controller operation data from a controller of the game system during the game process, the controller operation data reflecting operations performed on the controller by a sub player, the controller not including any display;
controlling, by the game apparatus, a controller subject in the virtual space during the game process based on the controller operation data, the controller subject being different from the player object and different from the non-player object; and
performing, by the game apparatus, a process on the non-player object based on the controller operation data and a position of the controller subject, the controller operation data specifying the process to be performed on the non-player object as inputted on the controller by the sub player,
wherein the terminal game image is a game image that includes the player object but does not include the controller subject.

16. A game apparatus of a game system, the game apparatus comprising:
a communication device configured to receive terminal operation data from a terminal device of the game system, the terminal operation data reflecting operations performed on the terminal device by a main player;
a game processor configured to
control a player object in a virtual space and to conduct a game process based on the terminal operation data, the terminal operation data comprising data to control actions of the player object as inputted on the terminal device by the main player, and
control a non-player object in the virtual space during the game process, the non-player object being different from the player object, and the terminal operation data not including any data to control the non-player object; and
a graphics processor configured to generate a terminal game image and a monitor game image based on the game process;

wherein the communication device is further configured to
provide the terminal game image to the terminal device, the terminal device including a terminal display, and
provide the monitor game image to a monitor of the game system, the monitor being separate from the terminal display,
wherein the communication device is further configured to
receive controller operation data from a controller of the game system during the game process, the controller operation data reflecting operations performed on the controller by a sub player, the controller not including any display,
wherein the game processor is further configured to
control a controller subject in the virtual space during the game process based on the controller operation data, the controller subject being different from the player object and different from the non-player object, and
perform a process on the non-player object based on the controller operation data and a position of the controller subject, the controller operation data specifying the process to be performed on the non-player object as inputted on the controller by the sub player, and
wherein the terminal game image is a game image that includes the player object but does not include the controller subject.

* * * * *